US012625686B1

(12) United States Patent
Maher et al.

(10) Patent No.: US 12,625,686 B1
(45) Date of Patent: May 12, 2026

(54) PROVIDER NETWORK DEFICIENCY MANAGEMENT

(71) Applicant: Amazon Technologies, Inc., Seattle, WA (US)

(72) Inventors: Sean Patrick Maher, Seattle, WA (US); Raghuveer Ketireddy, Redmond, WA (US); Trevor Tonn, Bellevue, WA (US); David M. Wheeler, Mesa, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 830 days.

(21) Appl. No.: 17/937,277

(22) Filed: Sep. 30, 2022

(51) Int. Cl.
| | |
|---|---|
| *G06N 5/02* | (2023.01) |
| *G06F 8/41* | (2018.01) |
| *G06F 8/70* | (2018.01) |
| *G06F 9/445* | (2018.01) |
| *G06F 11/36* | (2025.01) |
| *G06F 16/245* | (2019.01) |
| *G06F 16/901* | (2019.01) |

(Continued)

(52) U.S. Cl.
CPC .......... *G06F 8/433* (2013.01); *G06F 9/44589* (2013.01); *G06F 16/9024* (2019.01); *G06F 8/70* (2013.01); *G06F 8/75* (2013.01); *G06F 11/3089* (2013.01); *G06F 11/3672* (2013.01); *G06N 5/022* (2013.01)

(58) Field of Classification Search
CPC ... G06F 8/433; G06F 8/75; G06F 8/70; G06F 16/9024; G06F 16/245; G06F 16/951; G06F 16/2477; G06F 9/44589; G06F 21/577; G06F 21/563; G06F 21/552; G06F 21/554; G06F 11/3664; G06F 11/3672; G06F 11/3089; G06N 5/022
See application file for complete search history.

(56) References Cited

U.S. PATENT DOCUMENTS

| | | | | |
|---|---|---|---|---|
| 11,017,764 | B1 * | 5/2021 | Das | ................... G06F 16/90332 |
| 11,050,778 | B2 * | 6/2021 | Paturi | ................... G06F 16/986 |

(Continued)

OTHER PUBLICATIONS

Ibrahim Abdelaziz et al., A Toolkit for Generating Code Knowledge Graphs, Dec. 2-3, 2021, [Retrieved on Dec. 8, 2025]. Retrieved from the internet: <URL: https://dl.acm.org/doi/pdf/10.1145/3460210. 3493578> 8 Pages (137-144) (Year: 2021).*

(Continued)

*Primary Examiner* — Anibal Riveracruz
(74) *Attorney, Agent, or Firm* — Nicholson De Vos Webster & Elliott LLP

(57) ABSTRACT
A system for provider network deficiency management includes a deficiency management computing system in a provider network having a machine-readable definition file and a knowledge graph. A method for provider network deficiency management includes receiving a machine-readable definition file and generating a knowledge graph based on the machine-readable definition file. Additionally or alternatively, the method can include any or all of: scanning provider network infrastructure; analyzing software for vulnerabilities; determining a deficiency finding based on the knowledge graph; providing the deficiency finding in a user interface; or any other suitable processes.

20 Claims, 20 Drawing Sheets

200

(51) Int. Cl.

| | |
|---|---|
| *G06F 8/75* | (2018.01) |
| *G06F 11/30* | (2006.01) |
| *G06F 11/3668* | (2025.01) |
| *G06N 5/022* | (2023.01) |

(56) References Cited

U.S. PATENT DOCUMENTS

| | | | |
|---|---|---|---|
| 11,736,527 B1 * | 8/2023 | Joseph Durairaj | ......................... H04L 63/1433 726/1 |
| 2021/0194909 A1 * | 6/2021 | Tang | ..................... G06F 21/552 |
| 2022/0210202 A1 * | 6/2022 | Crabtree | ............. G06F 16/2477 |
| 2023/0130649 A1 * | 4/2023 | Schwartz | .............. G06F 16/245 726/23 |
| 2023/0169170 A1 * | 6/2023 | Yaron | ................... G06F 21/577 726/1 |
| 2023/0376603 A1 * | 11/2023 | Yaron | ....................... G06F 8/71 |
| 2023/0412635 A1 * | 12/2023 | Binyamini | ............... G06N 5/04 |
| 2024/0070483 A1 * | 2/2024 | Kochura | ............. G06F 16/9024 |

OTHER PUBLICATIONS

Capgemini, "The App-Modernization Manual—The Definitive Guide to Intelligent Apps", Available Online at <https://www.capgemini.com/in-en/wp-content/uploads/sites/6/2021/05/Capgemini_app_modernization_manual_1 _.pdf>, 2021, 52 pages.

Deloitte, "Application Modernization: innoWake Modernization", Available Online at <https://www2.deloitte.com/content/dam/Deloitte/us/Documents/technology/us-technology-application-modernization-innowake-modernization.pdf>, 2019, 2 pages.

New Relic, Inc., "The Enterprise Guide to Continuous Application Modernization", Available Online at <https://newrelic.com/sites/default/files/2021-08/enterprise-guide-continuous-application-modernization.pdf>, 2020, 19 pages.

* cited by examiner

100

PROVIDER NETWORK

DEFICIENCY MANAGEMENT COMPUTING SYSTEM

GRAPH COMPUTING FRAMEWORK

DEFICIENCY FINDING

MACHINE-READABLE DEFINITION FILE

KNOWLEDGE GRAPH

DEFICIENCY ANALYSIS ENGINE

REASONER

CONSTRAINT CHECKER

INFRASTRUCTURE SCANNER

SOURCE CODE VULNERABILITY SCANNER

PROCESSING SYSTEM

CPUS GPUS

CUSTOMER CLOUD (E.G., VPC)

POOL OF RESOURCES

SOURCE CODE REPOSITORY

STORAGE MEMORY

INTERMEDIATE NETWORK

REMOTE ELECTRONIC DEVICE

CLI

GUI

SDK

SCANNING PROVIDER NETWORK INFRASTRUCTURE 202

ANALYZING SOURCE CODE 204

RECEIVING A MACHINE-READABLE DEFINITION FILE 210

GENERATING A KNOWLEDGE GRAPH 220

DETERMINING A DEFICIENCY FINDING 230

PROVIDING THE DEFICIENCY FINDING 240

300

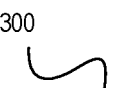

| ▼ REGION-US-EAST 　&　 USER: SMAHER   COMPANY-X |
|---|

DEFICIENCY FINDING

| | |
|---|---|
| FINDING | SOURCE CODE FILE "CJEE.PY" INVOKES SYSTEM.EXEC() |
| SEVERITY | HIGH |
| DESCRIPTION | RELIANCE ON SYSTEM.EXEC() FUNCTION TO RUN NATIVE COMMANDS ON THE OPERATING SYSTEM PROVIDE AN AVENUE FOR AN ATTACKER FOR COMMAND INJECTION. |
| DETAIL/TRACE | SOURCE CODE FILE "CJEE.PY" INVOKES SYSTEM.EXEC(). SYSTEM.EXEC() PROVIDES AN AVENUE FOR AN ATTACKER FOR COMMAND INJECTION. SOURCE CODE FILE "CJEE.PY" IS DEPLOYED TO COMPUTE INSTANCES "7QK8EP", "LT76C4", AND "7TBSEX." |
| RECOMMENDATION | DEPLOY HOTFIX TO INSTANCES "7QK8EP", "LT76C4", AND "7TBSEX". |

| ▼ REGION-US-EAST  USER: SMAHER COMPANY-X |
| --- |

<u>DEFICIENCY FINDING</u>

FINDING INTERMEDIARY INSTANCE "KLTKME" HANDLES
UNENCRYPTED SENSITIVE DATA (CREDIT CARD NUMBERS)

SEVERITY MEDIUM

DESCRIPTION AN INTERMEDIARY INSTANCE HANDLES SENSITIVE DATA
IN AN UNENCRYPTED FORM WITHOUT PROCESSING THE
DATA.

DETAIL/TRACE COMPUTE INSTANCE "KLTKME" RECEIVES CREDIT CARD
NUMBERS OVER AN ENCRYPTED NETWORK
COMMUNICATIONS CHANNEL (TLS) FROM COMPTUE
INSTANCE "JQHODJ." HOWEVER, COMPUTE INSTANCE
"KLTKME" HANDLES THE CREDIT CARD NUMBERS IN
UNENCRYPTED FORM WITHOUT PROCESSING THEM.

RECOMMENDATION ENCRYPT CREDIT CARD NUMBERS HANDLED BY
INTERMEDIARY INSTANCE "KLTKME".

▼ REGION-US-EAST    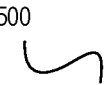    USER: SMAHER   COMPANY-X

DEFICIENCY FINDING

| | |
|---|---|
| FINDING | INSTANCE "CGHNDD" HAS "LOG4J" ZERO-DAY VULNERABILITY |
| SEVERITY | MEDIUM |
| DESCRIPTION | THE LOG4J ZERO-DAY VULNERABILITY ENABLES REMOTE CODE EXECUTION. |
| DETAIL/TRACE | COMPUTE INSTANCE "CGHNDD" HAS "LOG4J" ZERO-DAY VULNERABILITY. |
| RECOMMENDATION | USE BYTECODE INSTRUMENTATION TO OVERWRITE COMMAND EXECUTION PART OF THE CODE AT INSTANCE "CGHND" TO NULLIFY REMOTE CODE EXECUTION. |

*FIG. 5*

610
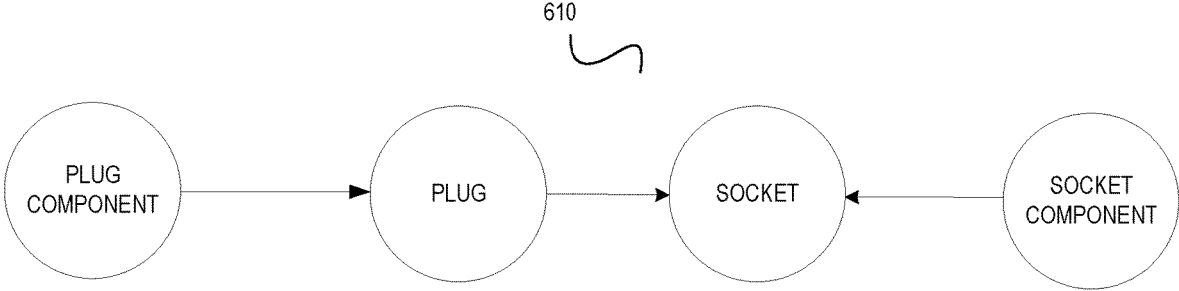
620
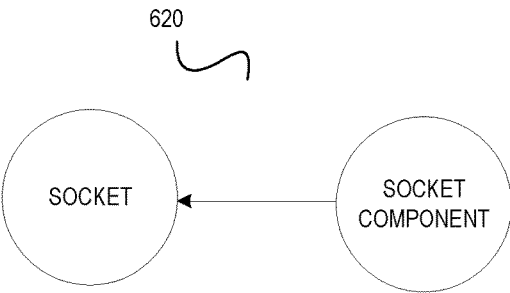
630
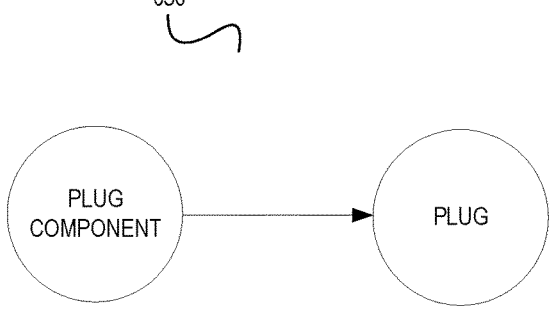
*FIG. 6*

710
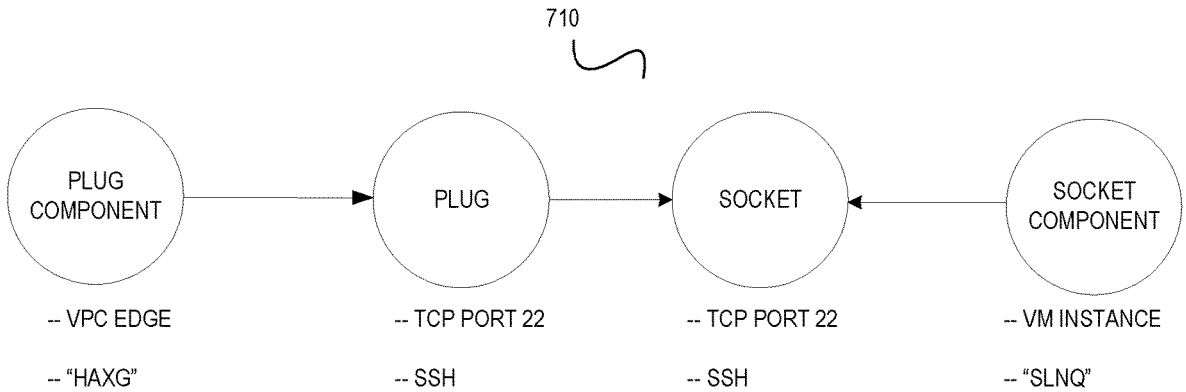
720
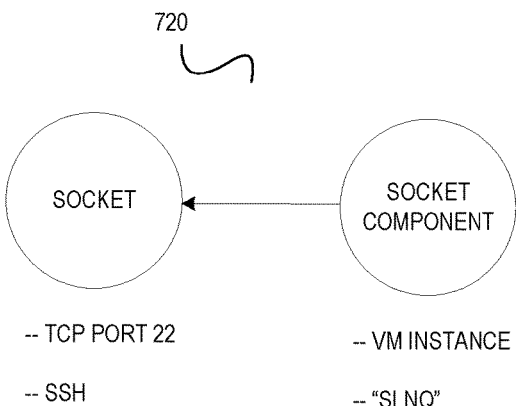
730
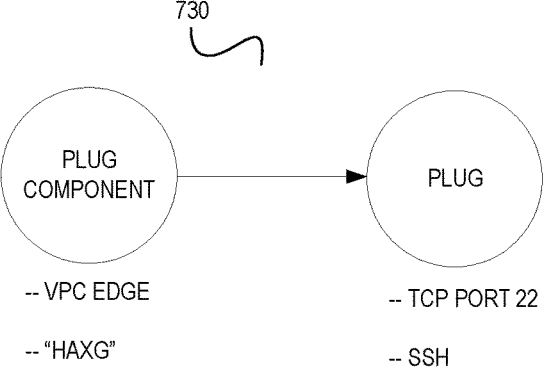
FIG. 7

810
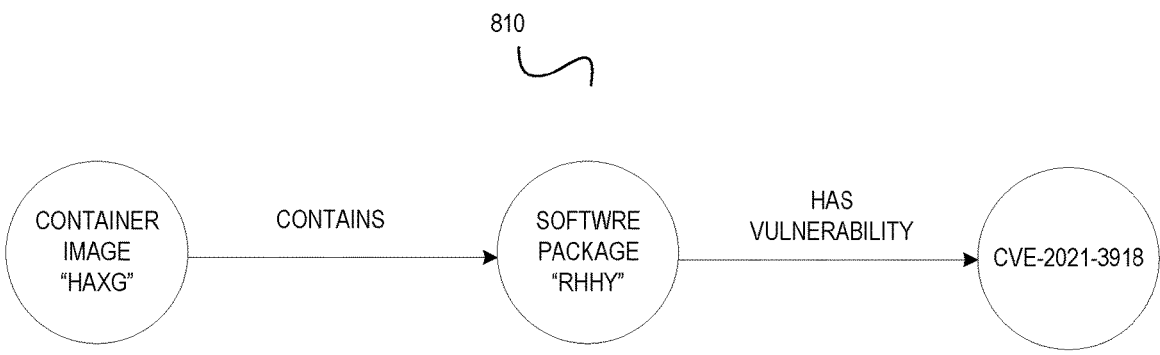
820
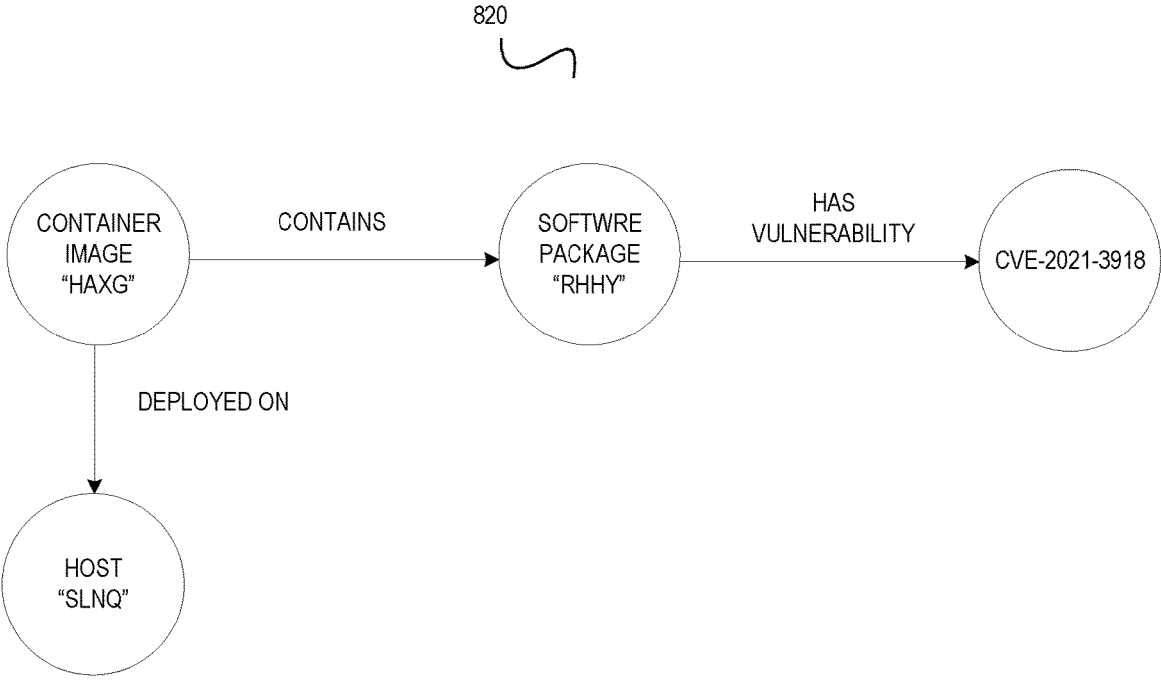
*FIG. 8*

910

1110
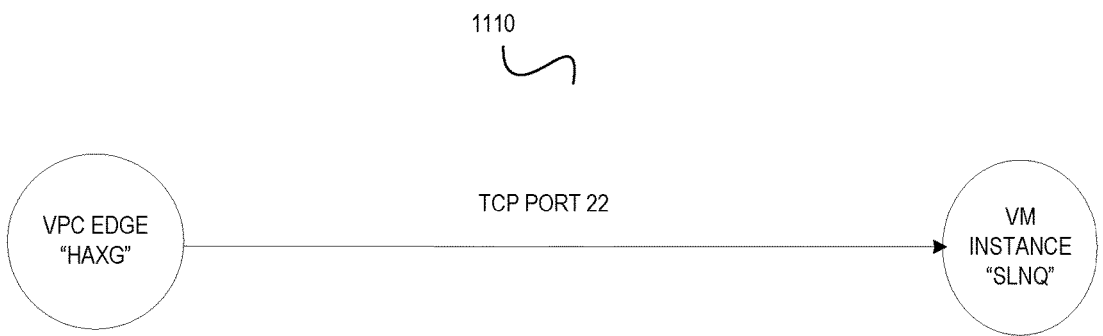
1120
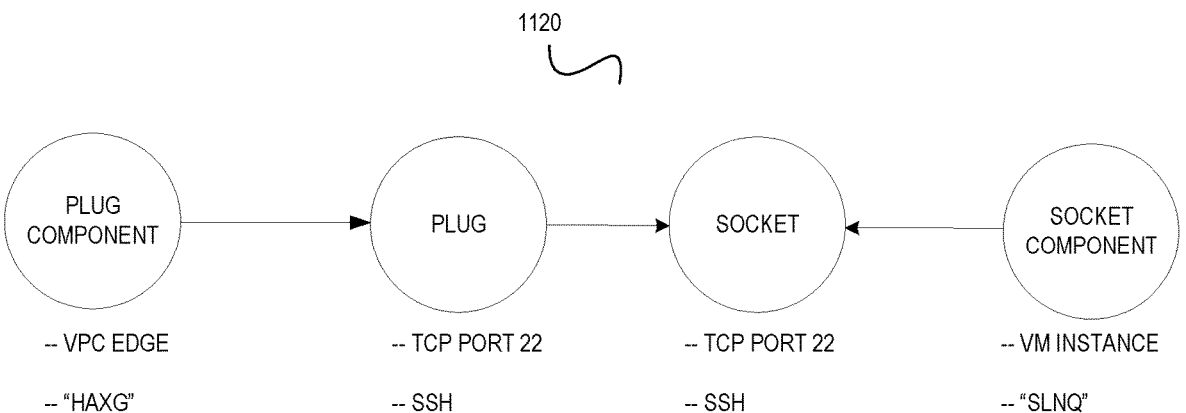
FIG. 11

1510
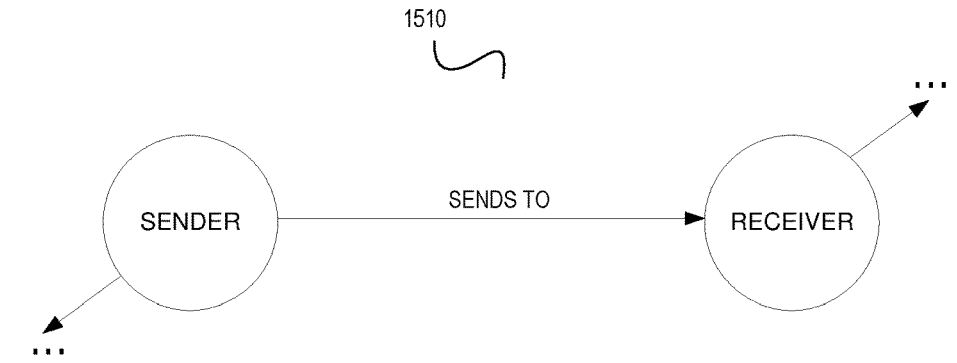
1520
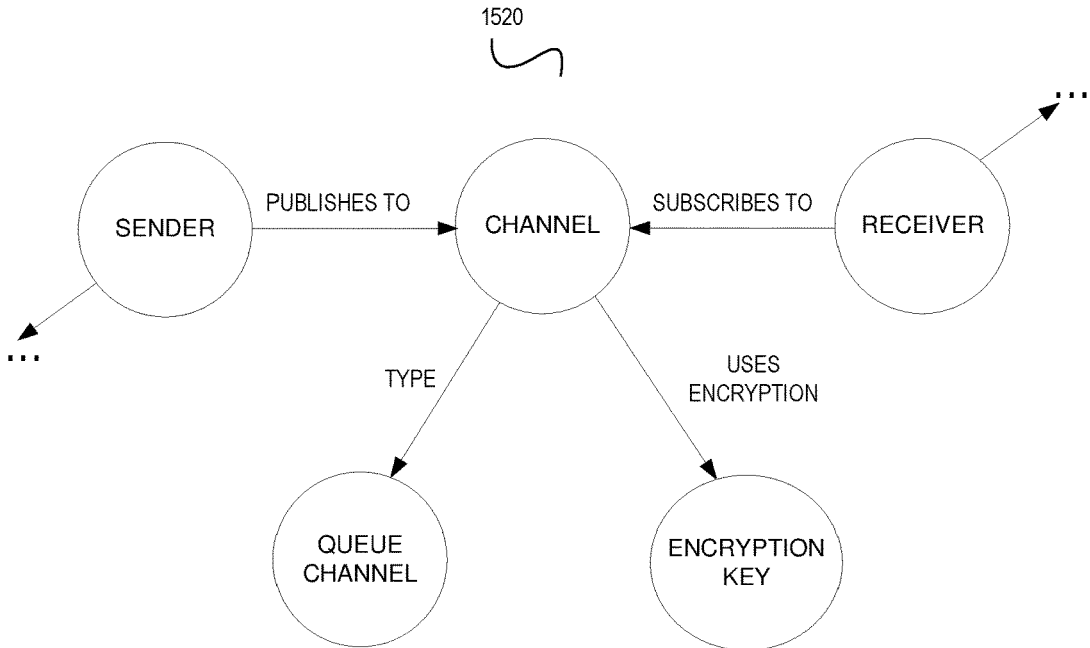
*FIG. 15*

1610

1710
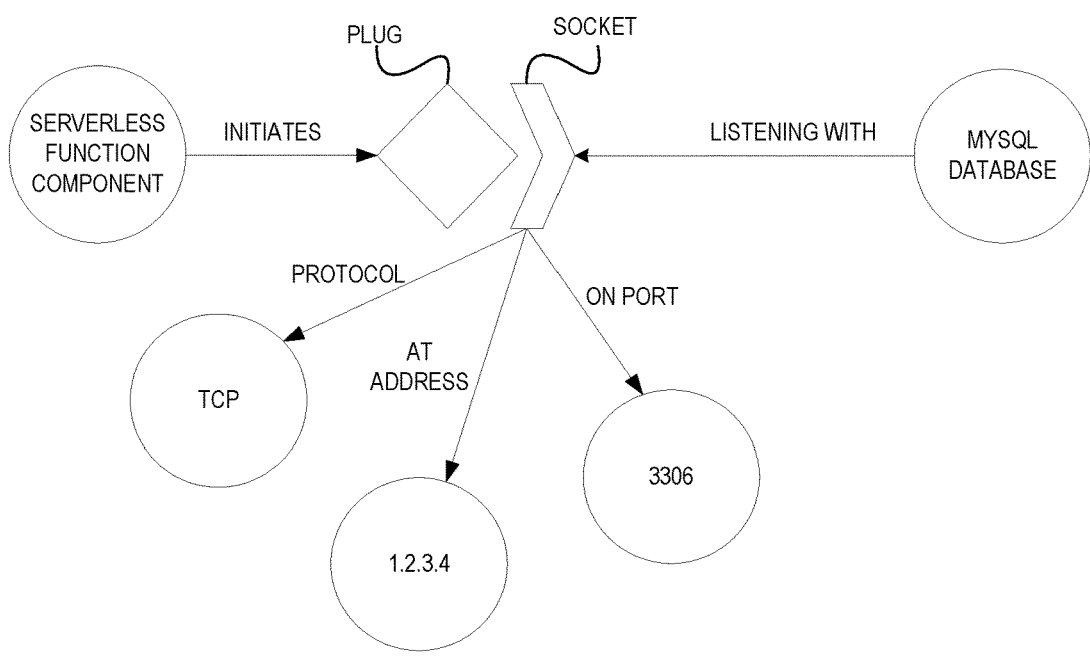
1720
BASE <urn:example:>
<some-function> a <serverless-function>;
       <initiates> <outgoing-connection>.
<my-database> a <MySQL-Database>;
       <provides> <a-socket>.
<outgoing connection> a <Plug>;
       <connected to> <a-socket>.
<a-socket> a <socket>;
       <on-port> "3306"^^xsd:integer;
       ...
*FIG. 17*

1810

PROVIDER NETWORK DEFICIENCY MANAGEMENT

TECHNICAL FIELD

The present disclosure relates generally to deficiency management systems and methods for identifying, classifying, prioritizing, remediating, and mitigating software, hardware, data storage, and network vulnerabilities, and more specifically to a new and useful system and method for provider network deficiency management.

BACKGROUND

Conventional systems and methods for vulnerability management can be classified into one of three approaches: design approaches relying on static analysis of machine-readable infrastructure definition files, code approaches based on static and dynamic analysis of software, and infrastructure approaches based on scanning infrastructure components. However, each of these approaches comes with its limitations. Further, many vulnerability management systems and methods apply only one or two of these approaches or apply all three approaches independently resulting in security flaws going undetected (too many false negatives) or inaccurate flaw detection (too many false positives).

Thus, there is a need in the vulnerability management field to create an improved and useful system and method for provider network deficiency management.

BRIEF DESCRIPTION OF DRA WINGS

Various examples in accordance with the present disclosure will be described with reference to the drawings, in which:

FIG. 1 is a schematic of a provider network system for deficiency management.

FIG. 3 depicts a graphical user interface (GUI) variation for providing a deficiency finding.

FIG. 4 depicts a graphical user interface (GUI) variation for providing a deficiency finding.

FIG. 5 depicts a graphical user interface (GUI) variation for providing a deficiency finding.

FIG. 6 illustrates a generic modelling mechanic for modelling in the knowledge graph a data communication channel between a sender and a receiver.

FIG. 7 depicts sub-knowledge graph variations for representing network reachability.

FIG. 8 depicts sub-knowledge graph variations for representing package vulnerability.

FIG. 11 depicts sub-knowledge graph variations for representing components and data communication channels in a system.

Figure 12:
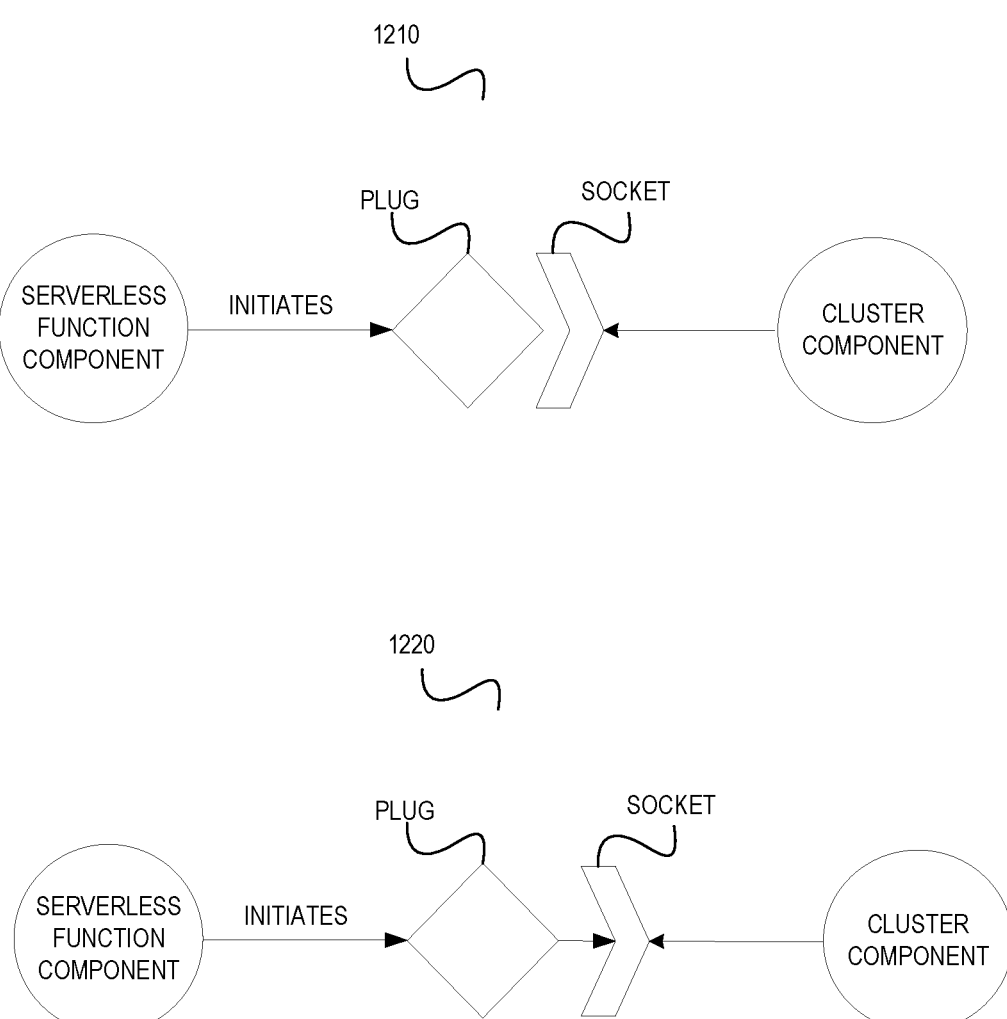

FIG. 12 provides examples of visual notations for a plug and socket modeling mechanic.

Figure 13:
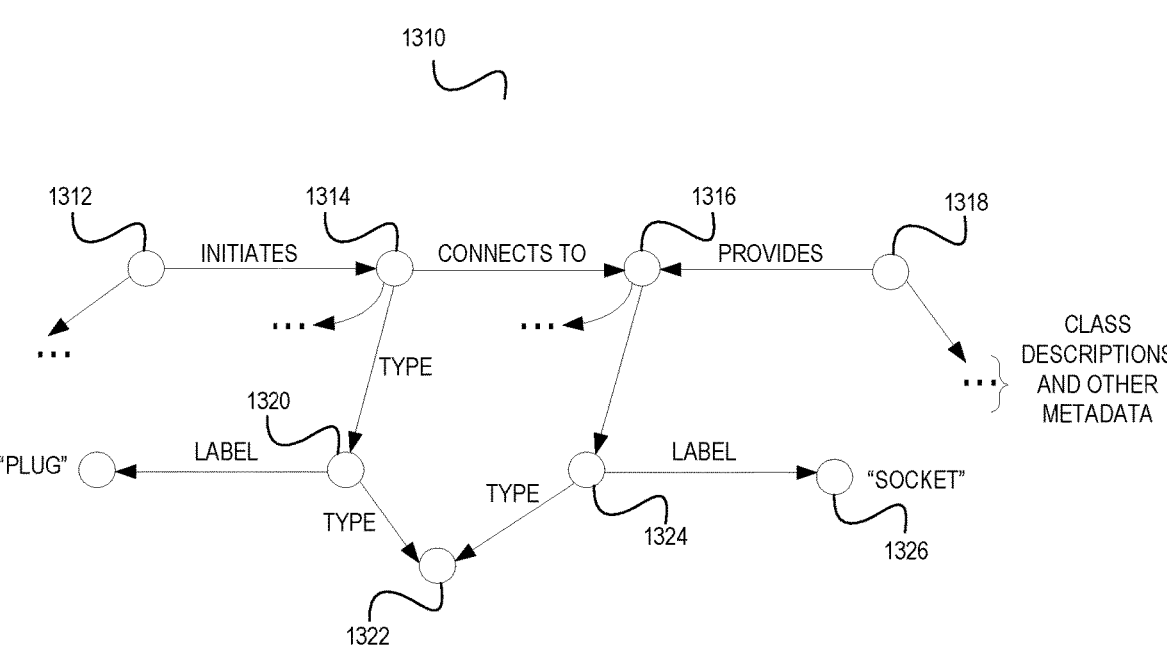

FIG. 13 provides an example of a RDF model that uses a plug and socket modeling mechanic.

Figure 14:
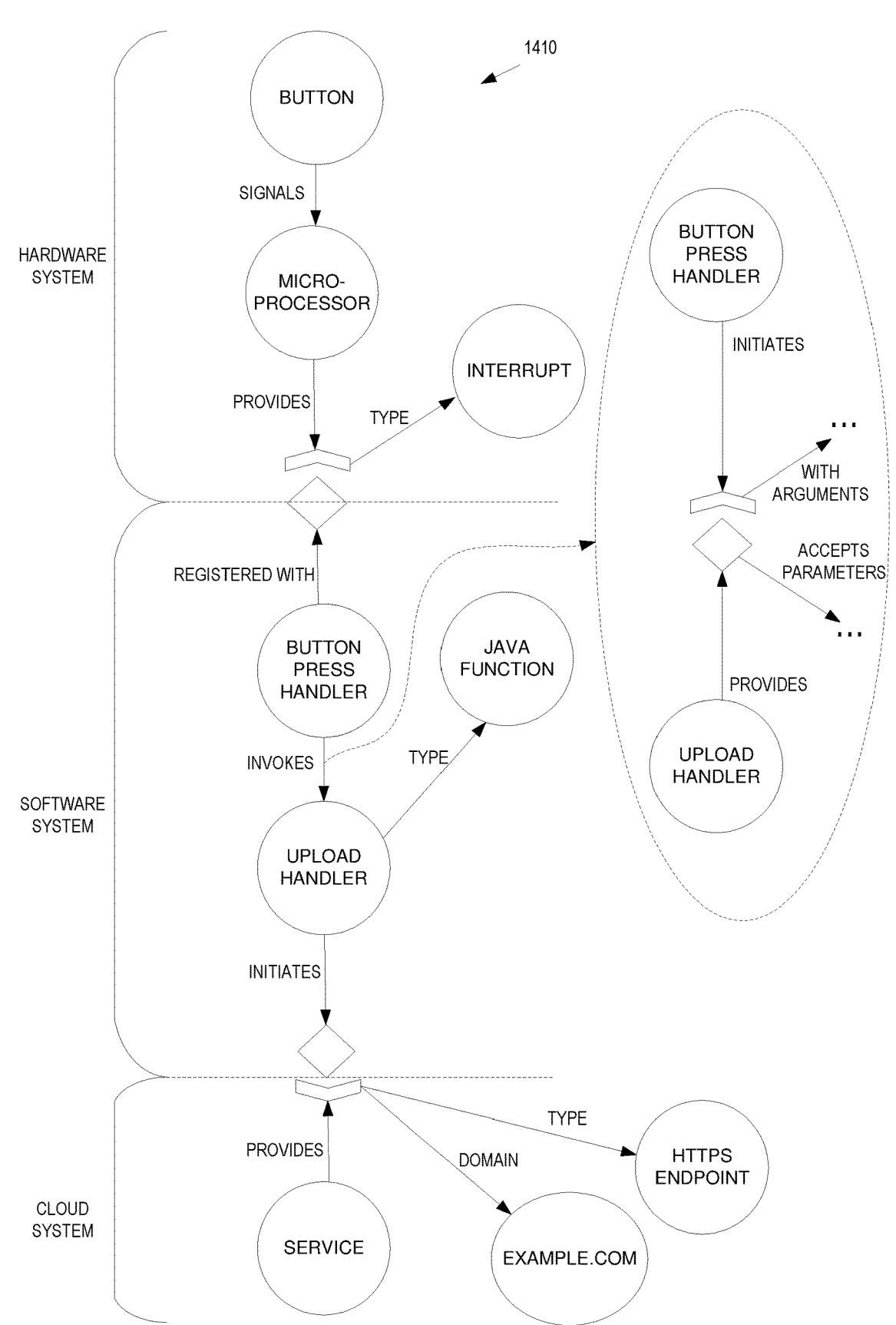

FIG. 14 provides a hardware design example that uses a plug and socket modeling mechanic.

FIG. 15 depicts examples of ways of modeling a queue channel in the knowledge graph at different levels of abstraction.

Figure 16:
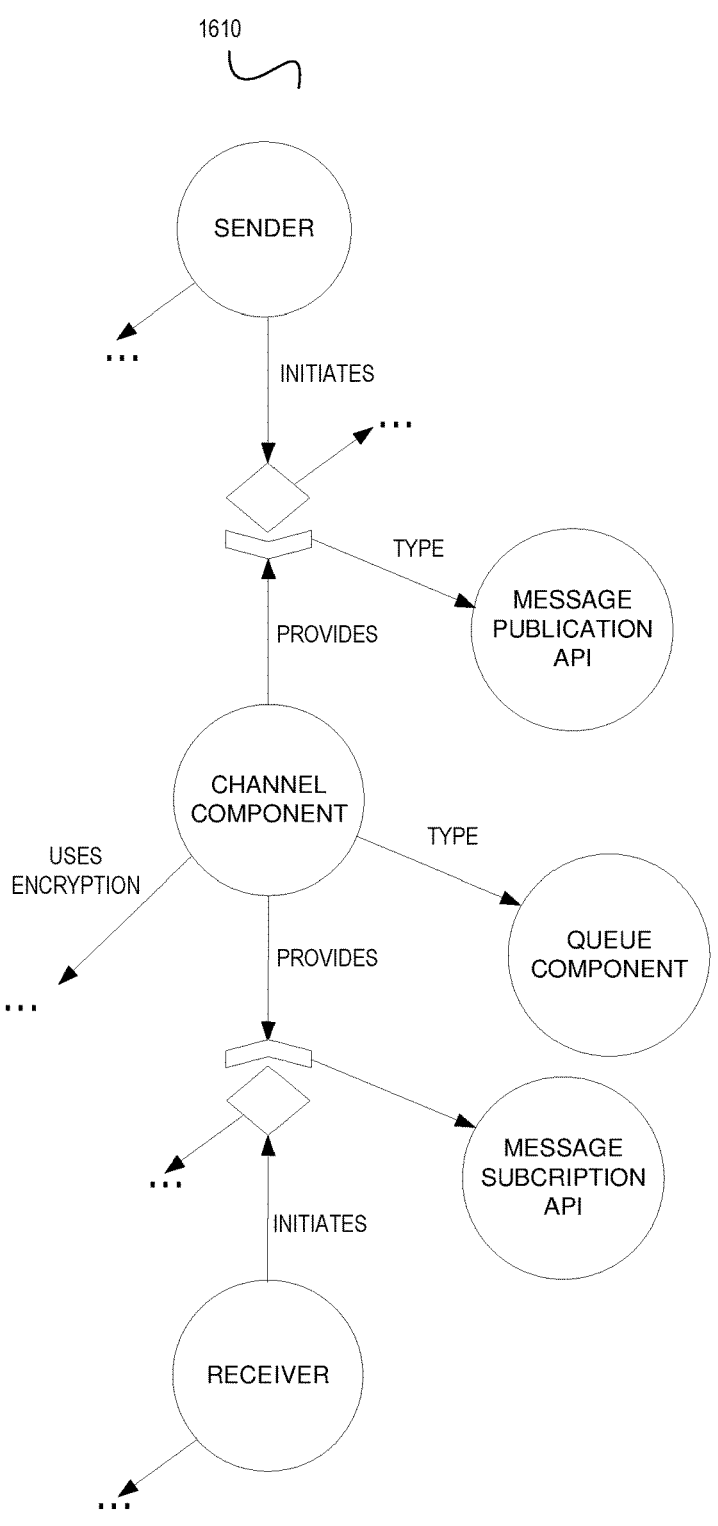

FIG. 16 depicts an example of modeling the queue channel in the knowledge graph using the plug and socket modeling mechanic.

FIG. 17 depicts an example of using the plug and socket modeling mechanic to model a channel between a serverless function and a database in the knowledge graph.

Figure 18:
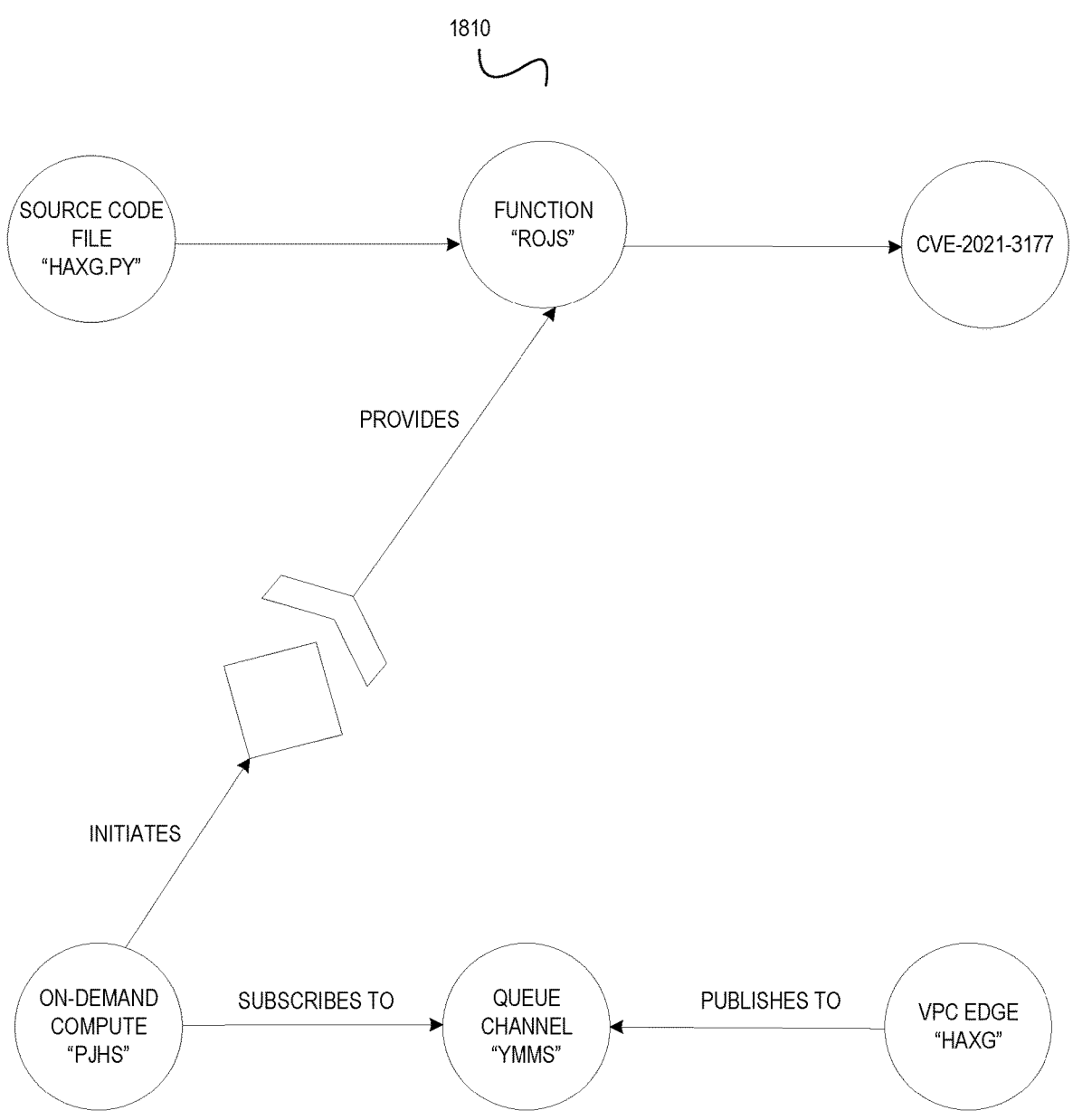

FIG. 18 depicts an example of using the plug and socket modeling mechanic to model for representing source code analysis.

Figure 19:
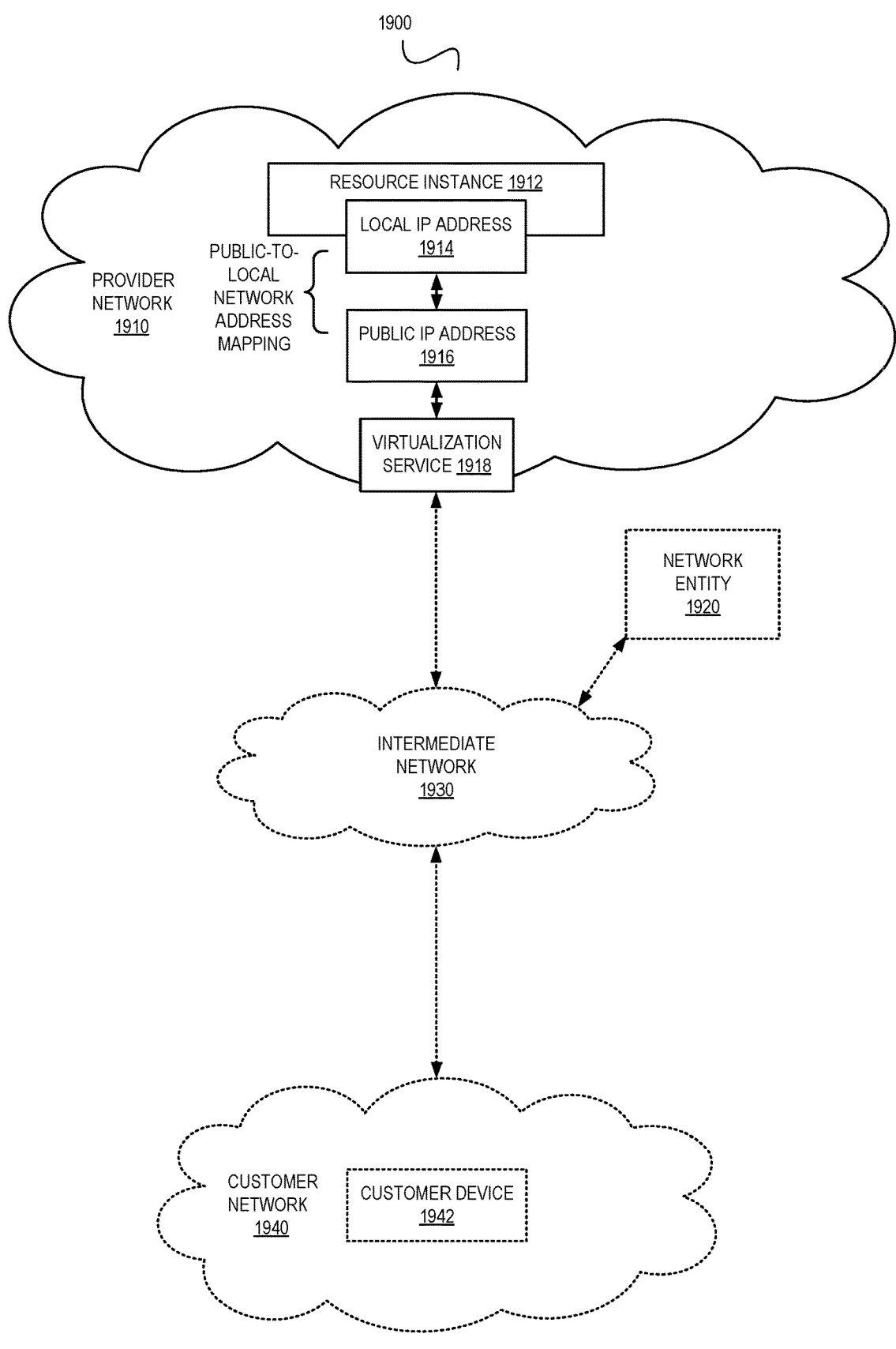

FIG. 19 illustrates a provider network environment in which the techniques disclosed herein can be implemented, according to some examples.

Figure 20:
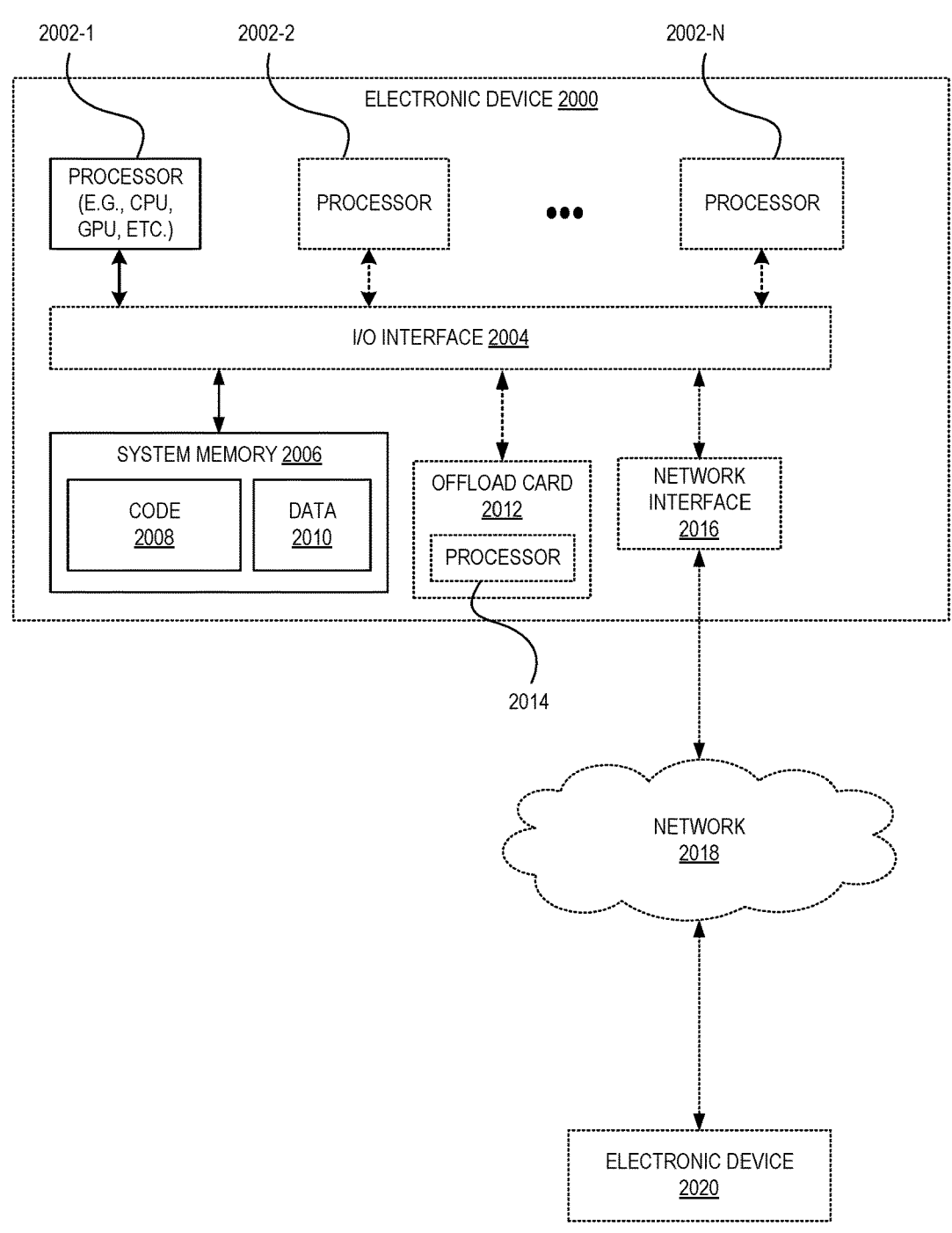

FIG. 20 illustrates an electronic device that can be used in an implementation of the techniques disclosed herein, according to some examples.

It will be appreciated that for simplicity or clarity of illustration, elements illustrated in the figures have not necessarily been drawn to scale. For example, the dimensions of an element may be exaggerated relative to another element for clarity. Further, if considered appropriate, reference numerals have been repeated among the figures to indicate corresponding or analogous elements.

DETAILED DESCRIPTION

The following description is not intended to limit the invention to the examples described, but rather to enable any skilled person in the art to make and use this invention.

1. Overview

The present disclosure relates to a system and a method for provider network deficiency management.

As shown in FIG. 1, a system 100 for provider network deficiency management includes a deficiency management computing system in a provider network having a machine-readable definition file and a knowledge graph. Additionally or alternatively, the system can include or interface with any or all of: a graph computing framework (equivalently referred to herein as a graph engine); a deficiency analysis engine, a deficiency finding, or any other suitable components or combination of components.

Figure 2:
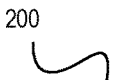
FIG. 2 is a schematic of a method for provider network deficiency management.

As shown in FIG. 2, a method 200 for provider network deficiency management includes receiving a machine-readable definition file 210 and generating a knowledge graph based on the machine-readable definition file 220. Additionally or alternatively, the method 200 can include any or all of: scanning provider network infrastructure 202; analyzing source code 204; determining a deficiency finding based on the knowledge graph 230; providing the deficiency finding in a user interface 240; or any other suitable processes. The method can be performed with a system as described above or with any other suitable system.

2. Benefits

The system or the method for provider network deficiency management can confer several benefits or advantages.

First, the system or the method confer the benefit of deficiency management through a graph representation, achieving an enhanced knowledge base.

This can in turn confer the benefit of achieving a uniform and flexible solution for deficiency management by any or all of: providing a common structure for modeling different provider network customer designs, provider network infra-
structure, or source code; making advanced inferences based
on the modeling about the provider network resource con-
figurations, which enables finding complex deficiencies in
the configurations; or any other suitable processes.

Second, in some examples, the system or method further
confers the benefit of finding complex deficiencies in pro-
vider network resource configurations by modeling compo-
nents and connections therebetween at different levels of
detail (different granularities), thereby enabling finding
complex deficiencies where such finding has confounded
conventional systems and methods. Equivalently, the system
or method can support advanced deficiency analysis by
modelling communication channels between components as
first-class vertices in the graph and using edges in the graph
to model relationships between components and channels.
This can enable finding deficiencies that span multiple
components and channels providing greater insight into the
structure of the components and the systems and services to
which the components belong or support. In a specific
example, a found deficiency is based on determining that a
particular component runs software that handles personally
identifiable information (PII) (e.g., credit card numbers). In
another example, a found deficiency is based on determining
that device hardware (e.g., a mobile phone microphone) is
connected to insecure data storage (e.g., storing unencrypted
audio data captured by the microphone).

Third, in some examples, the system or method confers
the benefit of reducing false positives and false negatives in
deficiency finding, by analyzing code, design, and infra-
structure together in full context.

Fourth, in some examples, the system or method confers
the benefit of enabling finding security vulnerabilities,
which can confer the subsequent benefits of: finding security
flaws; identifying the severity or impact of found flaws
based on runtime context; suggesting mitigations or controls
to meet security or compliance requirements; or can confer
any other benefit.

Fifth, in some examples, the system or method confers the
benefit of overcoming the shortcomings or conventional
systems and methods which can include, for instance, any of
all of: separate analysis of design, infrastructure, or code;
limited context in analysis; inability to find complex defi-
ciencies or vulnerabilities; insufficient coverage of potential
deficiencies or vulnerabilities; too many false positives; too
many false negatives; or any other shortcomings of conven-
tional systems and methods.

Additionally or alternatively, the system or the method
can confer any other benefit.

3. System

The system 100 can function to enable finding deficien-
cies in a provider network and includes: a machine-readable
definition file and a knowledge graph. Additionally or alter-
natively, the system can include or interface with any or all
of: a graph computing framework; a deficiency analysis
engine, a deficiency finding, or any other suitable compo-
nents or combination of components.

The system 100 can be configured to implement or
interface with a system which implements a graph-based
modeling of provider network design, infrastructure, or
code, the graph-based modeling providing a uniform and
centralized knowledge base, which is enabled by a model-
ling mechanic for representing communication channels
between components as first-class vertices of the graph. This
functions to enable finding complex deficiencies spanning multiple components and channels; across heterogenous
component types (e.g., across software, network, and hard-
ware); and at different component or channel granularities
(at different levels of detail or different levels of abstraction).

In a first set of variations, the system 100 can be imple-
mented in provider network applications. In these variations,
the machine-readable definition files can declare customer
resources according to a Software-as-a-Service ("SaaS")
provider network service model, but can additionally or
alternatively declare customer resources according to a
Platform-as-a-Service ("PaaS") service model, an Infra-
structure-as-a-Service ("IaaS"), or any other provider net-
work service model. Additionally or alternatively, resource
declarations in a machine-readable definition file can be
generated based on the results of a dynamic network scanner
such as, for example, NMAP, NESSUS, or the like, that
scans the provider network for resources. The definition file
can declare customer resources such as any or both of:
software, data storage, or network resources. Additionally or
alternatively, the definition file can declare hardware
resources or any other suitable compute, data storage, or
network resources.

3.1 System-Provider Network

The provider network can be programmed or configured
to adhere to a cloud computing model. The model can enable
ubiquitous, convenient, on-demand network access to a
shared pool of configurable resources such as virtual
machines, containers, networks, servers, storage, applica-
tions, services, or any other configurable resource of the
provider network. The resources can be rapidly provisioned
and released with minimal management effort or service
provider interaction.

A user of the provider network (sometimes referred to
herein as a "customer" of the provider network) can unilat-
erally provision resources in the provider network, such as
virtual machines, containers, server time, network storage,
or any other resource, as needed automatically without
requiring human interaction with the service provider.

Resources of the provider network can be available over
an intermediate network (e.g., the Internet) and accessed
through standard mechanisms that promote use by hetero-
geneous remote electronic devices such as thin or thick
client platforms or any other type of computing platform
such as desktop computers, mobile phones, tablet comput-
ers, laptop computers, workstation computers, smart appli-
ances, Internet-of-Things (IoT) devices, or any other type of
electronic device.

Resources such as storage, processing, memory, and net-
work bandwidth in the provider network can be pooled to
serve multiple customers using a multi-tenant model, with
different physical and virtual resources dynamically
assigned and reassigned according to customer demand.
There can be a sense of location independence in that the
customer generally can have no control or knowledge over
the exact location of provided resources but can be able to
specify location at a higher level of abstraction such as, for
example, at the level of a country, state, datacenter, or any
other location granularity.

The provider network can automatically control and opti-
mize resource use by leveraging a metering capability (e.g.,
on a pay-per-use, on a charge-per-use basis, on a subscrip-
tion basis, or any other fee basis) at a level of abstraction
appropriate to the type of service such as storage, process-
ing, bandwidth, active customer accounts, or any other level
of abstraction. Resource usage in the provider network can be monitored, controlled, and reported, providing transparency for both the provider and the customer of a utilized service.

The provider network can provide its capabilities to customers according to a variety of different service models including SaaS, PaaS, IaaS, or any other service model.

With SaaS, a capability can be provided to a customer using the provider network's software applications running on the infrastructure of the provider network. The applications can be accessible from various remote electronic devices through either a thin client interface such as a command line interface (CLI), a graphical user interface (GUI) (e.g., via a web browser or a mobile or web application), Software Development Kit (SDK), or any other interface. The infrastructure of the provider network can include the hardware resources such as server, storage, and network components and software deployed on the hardware infrastructure that support the services being provided. Typically, under the SaaS model, the customer does not manage or control the underlying infrastructure including network, servers, operating systems, storage, or individual application capabilities, except for limited customer-specific application configuration settings.

With PaaS, the customer can be provided the capability to deploy onto hardware and software infrastructure of provider network customer-created or acquired applications using programming languages, libraries, services, and tools supported by the provider or other sources. Typically, under the PaaS model, the customer does not manage or control the underlying hardware and software infrastructure including network, servers, operating systems, or storage, but can have control over the deployed applications and possibly configuration settings for the application-hosting environment.

With IaaS, the customer can be provided the capability to provision processing, storage, networks, and other fundamental computing resources where the customer can deploy and run arbitrary software, which can include operating systems and applications. The customer typically does not manage or control the underlying hardware and software infrastructure but can have control over operating systems, storage, and deployed applications and possibly limited control of selecting network components such as, for example, host firewalls.

The provider network can provide its capabilities to a customer according to a variety of different deployment models including as a private cloud, as a community cloud, as a public cloud, as a hybrid cloud, or any other deployment model.

In a private cloud, the hardware and software infrastructure of the provider network can be provisioned for exclusive use by a single organization which can comprise multiple customers. The private cloud can be owned, managed, and operated by the organization, a third party, or some combination of them, and it can exist on or off premises.

In a community cloud, the hardware and software infrastructure of the provider network can be provisioned for exclusive use by a specific community of customers from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure can be provisioned for open use by the public. The public cloud can be owned, managed, and operated by a business, academic, or government organization, or some combination of them. A public cloud can exist on the premises of the public cloud provider.

In a hybrid cloud, the infrastructure can be a composition of two or more distinct cloud infrastructures (private, community, public, or any other cloud infrastructure) that remain unique entities, but that can be bound together by standardized or proprietary technology that enables data and application portability such as, for example, cloud bursting for load balancing between clouds. While the distinct cloud infrastructures may remain unique entities in the hybrid cloud, the infrastructures can be logically merged (e.g., by software) to appear as if they are one infrastructure.

3.1 System-Components

The system 100 includes a deficiency management computing system, which functions to generate a knowledge graph from a machine-readable definition file. Additionally or alternatively, the computing system can function to perform any or all of: scanning provider network infrastructure; analyzing customer source code; generating the knowledge graph based on results of scanning the provider network infrastructure or results of analyzing the customer source code; determining a deficiency finding based on analysis of the knowledge graph; providing the deficiency finding to a customer at a remote electronic device (e.g., in a CLI, in a GUI, or via a SDK of the remote electronic device), or any other suitable functions.

The computing system can offer a centralized and uniform graph-based knowledge base with formal semantics, which enables the performance by the computing system of reasoning tasks based on a Web Ontology Language (OWL) or any other suitable Semantic Web language. The Semantic Web capabilities of the knowledge base allows the computing system to find complex deficiencies in a customer's design, infrastructure, or code.

To enable this, the computing system can be designed at least partially in a modular format including a set of computing components, referred to herein as knowledge converters (equivalently referred to herein as knowledge translators or knowledge agents), each processing different inputs and producing Semantic Web outputs (e.g., as any of or all of: OWL2 primitives, Resource Description Framework (RDF) primitives, RDF Schema (RDFS) primitives, or any other suitable Semantic Web primitives.). Each computing component contains a specific algorithm built to process a set of data inputs and generate a set of outputs for storage as part of the knowledge graph and according to a Semantic Web ontology (equivalently referred to herein as just an ontology or as a vocabulary) that defines (formalizes) the concepts and relationships (equivalently referred to as terms) used to described and represent customers' provider network designs, infrastructure, or code. The computing system can optionally include a deficiency analysis engine, which analyzes the output of each of these components as instantiated as a graph in the knowledge base (e.g., in the form of RDF triples) and performs semantic reasoning tasks to infer logical consequences from a set of facts, axioms, or other ground terms asserted by the graph (e.g., using a reasoning calculus such as a semantic tableau calculus). Logical consequences can also be inferred from non-ground terms based on parameterizing the non-ground terms during a reasoning task. Performance of a semantic reasoning task may include the computing system using input knowledge graph data to produce a symbolic output. At runtime, for instance, the knowledge converters mentioned above can accept respective inputs and output respective sub-graphs for inclusion as part of the overall knowledge graph. The sub-graphs can be analyzed by the deficiency analysis engine to produce a deficiency finding. Additionally or alternatively, multiple sub-graphs can be combined into a single graph which is analyzed by the deficiency analysis engine to produce a deficiency finding.

Additionally or alternatively, the system or computing system can be otherwise configured or designed. For example, while in some examples the knowledge base is graph-based and Semantic Web language based, knowledge about the provider network can be represented in the knowledge base in other ways. For example, a domain specific logic language such as, for example, COMMON LOGIC or MINIKANREN, can be used instead of a Semantic Web language for representing knowledge about the provider network.

The computing system can include an infrastructure scanner. The infrastructure scanner can be a common vulnerabilities and exposures (CVE) scanner of virtual machines and containers deployed in customer clouds (e.g., virtual private clouds (VPCs)) of the provider network, but additionally or alternatively can be any of or a combination of: a network port scanner, a web application scanner, a network scanner, an agent-based scanner, a database scanner, a cloud scanner, or any other suitable infrastructure scanner. Findings by the infrastructure scanner can include package findings, network reachability findings, or any other type of infrastructure scanner finding. The infrastructure scanner can function to collect data about the topology or configuration of resources and components in the provider network including package findings, network reachability findings, or any other type of infrastructure scanner finding made by the infrastructure scanner. The collected data can be integrated into or stored in the knowledge graph for later analysis for deficiencies using the techniques disclosed herein. A package finding by the infrastructure scanner can identify a software package installed on a virtual machine, container, or other customer cloud resource. A package finding by the infrastructure scanner can indicate that a software package is exposed to a known vulnerability (e.g., an unpatched vulnerability) that can be exploited by attackers to compromise the confidentiality, integrity, or availability of data, or to access other systems. A network reachability finding by the infrastructure scanner can indicate there are allowed network paths (which may or may not be desired by the customer) to virtual machines, containers, or other customer cloud resources in the customer's cloud. A network reachability finding can arise when a Transmission Control Protocol (TCP), User Datagram Protocol (UDP), or Stream Control Transmission Protocol (SCTP) port is reachable from a virtual private cloud edge such as an internet gateway (e.g., a gateway being an application load balancer or other load balancer), a virtual private cloud peering connection, a virtual private network through a virtual gateway, or any other virtual private cloud edge. A network reachability finding can indicate a customer cloud configuration that is overlay permissive such as, for example, a mismanaged security group, access control list, internet gateway, or any other customer cloud configuration.

While in some examples a network scanned by a network scanner is an Internet Protocol (IP)-based network, the network can be a non-IP system such as, for example, a Named Data Networking (NDN) system.

The system 100 can include a customer cloud. The customer cloud can include an on-demand configurable pool of resources (e.g., virtual machines, containers, etc.) allocated in the provider network to or for a particular customer.

The provider network can isolate one customer's pool of resources from another customer's pool of resources using virtual private cloud technology or any other suitable network isolation technology. Additionally or alternatively, the provider network can use resource isolation technology for isolating central processing units or memory between resources allocated to or for different customers.

The computing system can include a source code scanner. The source code scanner can use program analysis, machine learning, or other suitable static or runtime source code analysis technique to analyze and collect information about the code (e.g., PYTHON or JAVA code). The source code scanner can function collect knowledge about the structure and purpose of source code such as call paths and call graphs. Additionally or alternatively, the source code scan can function to identify issues such as resource leaks, security issues, or any other issue. The source code scanner can be configured to work with a source code repository. The source code repository can be outside (external to) the provider network (e.g., connected to the provider network via the intermediate network), inside the provider network (e.g., as a component of another computing system in the provider network), or in another location. The source code repository can also be a component of the computing system. The source code in the source code repository that is analyzed by the source code vulnerability scanner can be code that is deployed (e.g., in source code form or in interpretable or executable form) at a customer's pool of resources in their customer cloud of the provider network. Additionally or alternatively, the source code analyzed can be code that a customer is planning to deploy to the customer's pool of resources in their customer cloud but that has not yet been deployed. The data collected by the source code scanner can be integrated into or stored in the knowledge graph for later analysis for deficiencies using the techniques disclosed herein.

The computing system can include a graph computing framework. The graph computing framework can provide interfaces (e.g., application programming interfaces (APIs).) for components of the computing system to interact with the knowledge graph over its structure and process. The structure of the knowledge graph can encompass a data model defined by a vertex, edge, or property topology. The process of the knowledge graph can be the means by which the structure of the graph is analyzed. One way the structure of the knowledge graph can be analyzed is by traversal.

The graph computing framework can function to support online graph processing such as online graph database processing (OLTP), online graph analysis (OLAP), or other graph processing. The graph computing framework can function to support a graph query language for navigating (traversing) the vertices and edges of the knowledge graph. The graph query language can be based any or all of: SPARQL, GREMLIN, CYPHER, NGQL, or other suitable graph query language.

The graph query language in conjunction with the graph computing framework can support create (equivalently insert or add), read (equivalently fetch), update (equivalently set property or set), and delete (equivalently drop) operations on nodes (equivalently vertices), edges (equivalently relationships), vertex types (equivalently labels or tags), and edge types (equivalently labels or relationship types) of the knowledge graph. Additionally or alternatively, the graph query language in conjunction with the graph computing framework can support any or all of the following operations: traversing edges with specifies vertices, traversing edges reversely with specified vertices, querying N hops along a specified edge, finding paths between two vertices, or any other graph query language operation. Additionally or alternatively, set-based processing of the knowledge graph by the graph computing framework can be employed. For example, the knowledge graph may be represented as sets of RDF triples. The RDF triples can be processed by the graph computing framework by filtering the RDF triples for ones that match an expression specified using a graph query language.

The computing system can include a deficiency analysis engine. The deficiency analysis engine can function to determine or infer a deficiency finding based on analysis of the knowledge graph. For analyzing the knowledge graph the deficiency analysis engine can include a reasoner and a constraint checker. The reasoner can be applied to an ontology of the knowledge base written using the web ontology language (OWL) or other semantic web ontology language. The reasoner can perform subsumption testing, classification, or any other reasoning operation for description logic ontologies.

The constraint checker can function to validate the knowledge graph in the form of a graph against a set of conditions. The conditions can be expressed as shapes and other constructs expressed in the form of a graph (equivalently a shape graph). The knowledge graph in the form of a graph can be validated against a shape graph. The shape graph can validate that the knowledge graph satisfies the set of conditions and produce a description of the knowledge graph that satisfies the set of conditions. The description can be used for various purposes including validation of the knowledge edge graph but additionally or alternatively for user interface building, code generation, data integration, or other purpose. Additionally or alternatively, constraints can be represented as a rules, graph query language queries, or a combination of rules and queries. For example, rules can be expressed as first order logic (e.g., as Horn clauses in the PROLOG programming language).

The deficiency analysis engine can function to produce a deficiency finding based on an analysis of the knowledge graph (e.g., based on using the reasoner or the constraint checker). A finding can encompass a report about a potential deficiency that affects a customer's resource. The deficiency finding can pertain to a deficiency that affects a customer's a virtual machine resource or a container resource but additionally or alternatively can pertaining to a deficiency that affects any or all of software, network, or hardware resources associated with the customer cloud or other hardware resources such as on-premises hardware resources or hardware device designs (e.g., the circuit layout for a personal electronic device.)

A deficiency finding can pertain to a failing or shortcoming of a customer cloud or the customer's pool of resources therein. Additionally or alternatively, a deficiency finding can pertain to security vulnerabilities of a customer cloud or the customer's pool of resources therein. For example, a deficiency finding can pertain to privacy, regulatory, redundancy, scaling, or cost optimization issues with a customer cloud independent of or in addition to any vulnerabilities. Additionally or alternatively, a deficiency finding can pertain to common software or hardware vulnerabilities.

FIG. 3 depicts a graphical user interface (GUI) variation for providing a deficiency finding. The GUI 300 presents a finding, an indication of the severity of the finding, a description of why the finding is relevant, a detailed justification for why the system believes the finding to be present, and a recommendation for mitigating the deficiency. In this example, because the knowledge base represents both (a) the knowledge that the customer's source code file invokes system.exec ( ) and (b) that the source code file (or an interpretable or executable version thereof) is deployed to three particular instances (e.g., virtual machine or container instances) in the customer's pool of resources, the deficiency finding can provide a recommendation indicating which of the customer's particular instances need to be patched with a hotfix that removes the call to system.exec ( ) or takes other appropriate remediation.

FIG. 4 depicts a graphical user interface (GUI) variation for providing a deficiency finding. The GUI 400 presents a finding, an indication of the severity of the finding, a description of why the finding is relevant, and a recommendation for mitigating the deficiency. In this example, because the knowledge base represents that unencrypted credit card number data is handled by a particular instance (e.g., a virtual machine or container instance) in the customer's pool of resources without being processed, the deficiency finding can provide a recommendation to configure the particular instance to encrypt the credit card number data while handling the data. Here, the particular instance can be intermediary in the sense that it receives the credit card number data in an encrypted form from a source instance, decrypts the credit card number data received from the source instance, handles the decrypted credit card number data, and encrypts the credit card number data before sending the encrypted credit card number data to a target instance. In this case, since the intermediary instance merely handles the credit card number data as opaque data (e.g., stores it in and out of memory locations) and does not process it (e.g., by parsing the data), then there is no need for the intermediate instance to handle the data in unencrypted form. Thus, for security and privacy, the intermediary instance should encrypt the data (e.g., using a symmetric key) while it handles the data. Additionally or alternatively, the deficiency finding can provide a detailed trace of the finding that identifies particular components affected. In this example, the deficiency finding specifies a particular compute instance in the customer's cloud receives credit card numbers from another compute instance in the customer's cloud over a network communications channel that is encrypted using Transport Layer Security (TLS). However, the received compute instance handles the credit card numbers in unencrypted form after receiving them and does so without processing the credit card numbers. Here, handling can include operations performed on the unencrypted data representing the credit card numbers that treat the unencrypted data opaquely, without processing the data in a way that is particular to credit card numbers. Such handling might include for example storing the unencrypted data in and out of memory locations or serializing and deserializing the unencrypted data.

FIG. 5 depicts a graphical user interface (GUI) variation for providing a deficiency finding. The GUI 500 presents a finding, an indication of the severity of the finding, a description of why the finding is relevant, and a recommendation for mitigating the deficiency. In this example, because the knowledge base represents that the log 4j logging software is deployed at a particular instance (e.g., a virtual machine or container instance) in the customer's pool of resources, the deficiency finding can provide a recommendation to mitigate the zero-day vulnerability at the particular instance. Additionally or alternatively, the deficiency finding can provide a detailed trace of the finding that identifies particular components affected. In this example, the deficiency finding specifies a particular compute instance in the customer's cloud contains a particular vulnerability.

The computing system includes a processing system, which functions to process the inputs received at the computing system. The processing system include a set of one or more central processing units (CPUs) and optionally a set of one or more graphical processing units (GPUs) but can additionally or alternatively include any other hardware components or combination of hardware components (e.g., processors, microprocessors, system-on-a-chip (SoC) components, etc.). Any of or all of: CPUs, GPUs, and other hardware components or combination of hardware components can be components of a set of one or more electronic devices (e.g., electronic device 2000 described below with respect to FIG. 20.).

The computing system can optionally further include any or all of: memory, storage, or any other suitable hardware components. Any of or all of: storage, memory, and other suitable hardware components can be components of a set of one or more electronic devices (e.g., electronic device 2000 described below with respect to FIG. 20.).

Further additionally or alternatively, the system 100 can include any other suitable components or combination of components.

4. Method

As shown in FIG. 2, the method 200 includes receiving a machine-readable definition file 210 and generating a knowledge graph based on the file 220. Additionally or alternatively, the method 200 can include any or all of: scanning provider network infrastructure 202; analyzing source code 204; determining a deficiency finding 230; providing the deficiency finding 240; or any other suitable processes.

The method can implement or interface with a system implementing provider network deficiency management as described above but can additionally or alternatively implement or interface with systems implementing any other suitable deficiency or vulnerability management.

The method 200 functions to generate a knowledge base graph representing knowledge about the design, the infrastructure, or the code of a planned or deployed pool of resources for a customer of a provider network. Additionally or alternatively, the method 200 can function to expand the knowledge of the knowledge graph by scanning provider network infrastructure for vulnerabilities or analyzing source code, to determine a deficiency of the customer's planned or deployed pool of resources, to provide a determined deficiency to the customer, or perform any other suitable functions or operations.

The method 200 can be performed with a system 100 as described above but can additionally or alternatively be performed with any suitable system.

The method 200 can be performed once or repeatedly (e.g., performed continuously or periodically) but can additionally or alternatively be performed at any or all of: a predetermined frequency (e.g., a constant frequency), in response to a trigger or detection of an event, at a set of intervals (e.g., random intervals), or at any other suitable times.

4.1 Method—Scanning Provider Network Infrastructure

The method 200 can include scanning provider network infrastructure 202, which functions to scan a pool of resources in a customer cloud. Scanning can include monitoring the resources for software, hardware, storage, or network resources or network paths between resources or discovering software, hardware, storage, or network resources. Scanning can include automatically discovering resources and undertaking continuous scanning of resources for software and network resources. A scan of resource can also be triggered in response to a detected event such as, for example, the installation of a new application or patch.

Scanning provider network infrastructure 202 can include scanning virtual machine instances (virtual machines) in the customer's cloud. A virtual machine can be scanned at various times including upon discovery of the virtual machine instance, when the virtual machine is launched, when software is installed on (deployed to) the virtual machine, when a new vulnerability or exposure becomes known, or at any other suitable time.

A virtual machine instance can be scanned for network reachability. Scanning a virtual machine can produce a finding that a virtual machine instance is reachable from the internet or from a network device at the edge of the customer cloud. Scanning a virtual machine instance can include scanning TCP and UDP ports of the virtual machine instance for listeners. A customer's virtual machine instance might be reachable from the edge of the customer's virtual private cloud including via an internet gateway, an application load balancer, a virtual private cloud peering connection, a virtual private network through a virtual gateway, or other VPC edge device or connection.

Scanning provider network infrastructure 202 can include scanning the customer's virtual machine instances to identify reachable TCP and UDP ports. A finding of network reachability by scanning provider network infrastructure 202 can be stored as part of the knowledge graph. In doing so, instead of representing network reachability between a VPC edge and a VM instance directly via two vertices and one edge of the knowledge graph, the representing of the network reachability in the knowledge graph can include an intermediate vertex that represents a port that the VM instance is listening on and that the VPC edge can reach over the network. This provides flexibility when making deficiency findings.

FIG. 6 depicts a generic plug-and-socket modelling mechanic 610 for modeling data in the knowledge graph. The mechanic 610 can be used to model virtually any connection between a "plug" component and a "socket" component. The plug or socket component can be a hardware or software component. For example, the plug or socket component can be any of: a host, a compute device, a compute instance, a virtual machine, a container, a container image, a source code file, an on-demand compute instance, a VPC edge, a software interrupt handler, a physical or virtual button or other user input element, or virtually any other software or hardware component to be modelled.

Significantly, instead of modelling the connection between the plug and socket components as merely an edge in the knowledge graph, the connection is instead modelled as an edge from a "plug" node of the connection to a "socket" node of the connection. The socket node represents a capability of the socket to make the connection with a plug component. The plug node represents a capability of the plug component to make the connection with a socket component. The edge from the plug node to the socket node represents that the plug component connects to the socket component. The type of connection can be defined by attributes of the plug or socket nodes as in examples discussed herein.

By modelling the connection with the plug and socket nodes, it is possible to model just the capability of socket component to make the connection with a plug component in the absence of any particular plug component that currently makes the connection. This is depicted by mechanic 620. Likewise, it is also possible to model just the capability of the plug component to make the connection with a socket component in the absence of any particular socket component that currently makes the connection. This is depicted by mechanic 630.

For example, FIG. 7 depicts example sub-graphs that can be stored as part of the knowledge graph based on making a finding that the default SSH port of a customer's particular VM instance is reachable within the customer's cloud from a particular VPC edge. Any or all of sub-graphs 710, 720, 730, or any other suitable sub-graph can be included as part of the knowledge base based on this finding. Sub-graph 710 represents the knowledge gained based on scanning the provider network infrastructure 202 that the particular VM instance is listening on TCP port 22 and that TCP port 22 of the particular VM instance is reachable on a network from the particular VPC edge (e.g., an internet gateway, an application load balancer, a virtual private cloud peering connection, a virtual private network through a virtual gateway, or other type of VPC edge). Sub-graph 720 represents the knowledge gained based on scanning 202 that the particular VM instance is listening on TCP port 22. Sub-graph 730 represents the knowledge gained based on scanner 202 that the particular VM instance is reachable on a network from the particular VPC edge.

In sub-graphs 710 and 720, in contrast to sub-graph 730, the TCP port 22 that the particular VM instance is listening on is represented by a vertex as opposed to an edge. By doing so, a deficiency finding with respect to the particular VM instance can be made independent of the fact that any VPC edge can reach the TCP port 22. For example, the customer's security policy may require that the particular VM instance not run a listener on TCP port 22. By representing the TCP port 22 as a vertex as opposed to an edge in the knowledge graph, this deficiency can be found by looking for a pattern in the graph of a VM instance listening on TCP port 22, even if there is no incoming edge from a vertex representing a VPC edge that can reach the network port.

Scanning provider network infrastructure 202 can include scanning the customer's container images. The container images can be stored in a registry of container images in the provider network. At a time of scanning a container image, the container image may or may not be deployed in the customer cloud. Thus, scanning container images can encompass scanning container images that are currently deployed in the customer cloud and container images that are not currently deployed.

Scanning a container image can include scanning for software packages at the registry level. Software packages discovered by the scanning can be represented in the knowledge graph. The technique disclosed herein can be applied to the knowledge graph to determine common software vulnerabilities such as any one or more of: out-of-bounds write; improper neutralization of input during web page generation ('cross-site scripting'); improper neutralization of special elements used in an SQL command ('SQL injection'); Improper Input Validation; out-of-bounds read; improper neutralization of special; elements used in an OS command ('OS command injection'); use after free; improper limitation of a pathname to a restricted directory ('path traversal'); cross-site request forgery (CSRF); unrestricted upload of File with dangerous type; NULL pointer dereference; deserialization of untrusted data, or any other common software vulnerability or exposure.

A discovery of a software package with respect to a customer's container image by scanning provider network infrastructure 202 can be stored as part of the knowledge graph. A deficiency finding of a common software vulnerability with a discovered software package can also be stored as part of the knowledge graph. For example, FIG. 8 depicts example sub-graphs 810 and 820 that can be stored as part of the knowledge graph based on making a finding that a particular container image contains a software package with a particular common vulnerability or exposure. In this example, the common vulnerability or exposure is CVE-2021-3918, which refers to a JAVASCRIPT library that was vulnerable to prototype pollution during validation of a JAVASCRIPT OBJECT NOTATION (JSON) object that allowed an attacker to modify the behavior of a program executing the library to execute malicious code. Sub-graph 810 represents that the particular container image (e.g., a DOCKER or OCI format compatible image) contains a particular software package that has a particular common vulnerability or exposure (CVE). Sub-graph 820 includes sub-graph 810 but with an additional piece of knowledge that the particular container image is deployed to a particular host.

4.2 Method—Analyzing Source Code

The method 200 can optionally include analyzing source code 204, which functions to analyze source code associated with a customer cloud, a device's firmware, or any other software of interest to the customer or the service provider, and populate the knowledge graph based on the results of the analysis. Additionally or alternatively, analyzing source code 204 can function to analyze source code for any suitable purpose of the method 200 (e.g., detect source code vulnerabilities, recommend optimizations, etc.). Additionally or alternatively, analyzing source code 204 can include determining (e.g., generating) some or all of the source code, combining source code (e.g., from one or more source code repositories), processing or preprocessing source code, or any other suitable processes.

Analyzing source code 204 can be performed throughout the method 200, such as any or all of: continuously, at a predetermined frequency, at random intervals, prior to each of a set of processes of the method 200, or at any other suitable times, analyzing source code 204 can additionally or alternatively be performed in response to a trigger (e.g., based on a change made to source code in the source code repository, based on a request to deploy source code in an interpretable or executable form to a customer cloud, etc.), at random intervals, or at any other suitable time(s) during the method 200.

The analysis of the source code analyzed in 204 can include a security analysis of the source code, such as any or all of: checking for top web application security risks such as broken access control, injection, or data integrity failures; checking API security for interfacing with other services in provider network (e.g., virtualization services or public key management services); checking for compliance with web service security best practices; checking for compliance with JAVA programming language best practices, checking for compliance with PYTHON programming language best practices; checking for LDAP injections, checking for leakage of personal or sensitive information such as logging of user account credentials in plain text; checking for malformed or malicious data from untrusted sources; checking for Log4Shell-type or other remote code execution (RCE) vulnerabilities by checking that the source code properly prevents forged log entries or injection of malicious content into logs; or any other suitable static analysis.

The analysis of the source code analyzed in 204 can include a secrets detection analysis of the source code, such as using machine learning-based analysis to detect secrets that are hardcoded in source repository or configuration files, including passwords, API keys, SSH keys, access tokens, database connection strings, or JSON web tokens, or any other suitable secrets detection analysis.

The analysis of the source code analyzed in 204 can include a code quality analysis of the source code, such as any or all of: checking for compliance with web service best practices (e.g., correct use of web service APIs vis-à-vis polling and pagination); checking for compliance with JAVA or PYTHON programming language best practices; detecting missing synchronization resulting in incorrect functionality or excessive synchronization leading to performance issues; analyzing coding patterns with the source code repository and detecting when there is an anomalous coding pattern that deviates from a standard pattern; identifying code complexities or any characteristics in the source code that makes the source code harder to maintain; checking for correct handling of resources (e.g., releasing database connections); checking for parameters or lines of source code that could result in a runtime error (e.g., forgetting to check whether an object is NULL before using it, reassigning a synchronized object, forgetting to initialize a variable along an exception path, etc.); identifying duplicated code that might be consolidated for better source code maintainability, or any other suitable source code quality analysis.

The analysis of the source code analyzed in 204 can include a control flow analysis of the source code, such as a control flow analysis based on any or all of: abstract interpretation, constraint solving, a type system, or any other suitable control flow analysis. A result of the control flow analysis can encompass the order in which imperative programming language statements, instructions, or function calls are evaluated. Control flow analysis can detect different types of a control flow statements including any or all of: unconditional branches; jumps; conditional branches; loop; subroutines; coroutines; continuations; unconditional halts; or any other type of control flow statement.

Figure 9:
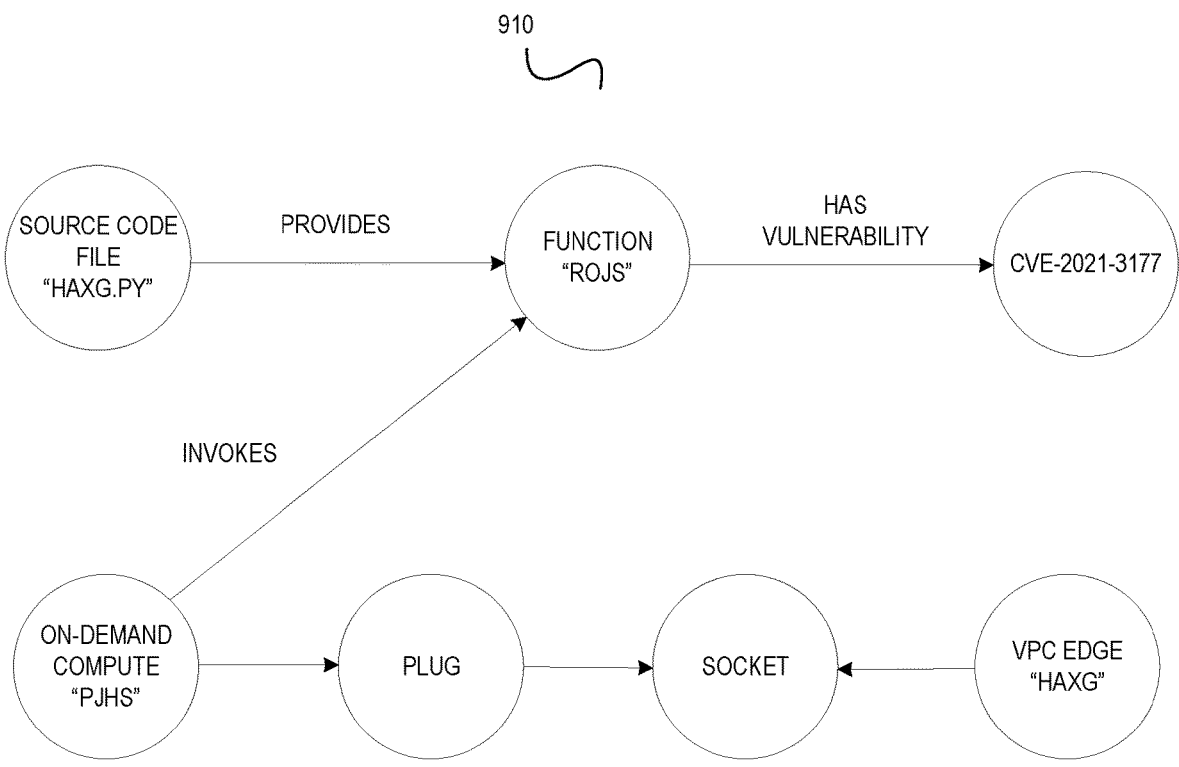
FIG. 9 depicts a sub-knowledge graph variation for representing source code analysis.

A finding of the source code analysis with respect to a customer's source code by analyzing the source code 204 can be stored as part of the knowledge graph. For example, FIG. 9 depicts example sub-graph 910 that can be stored as part of the knowledge graph based on making a finding that a particular source code file provides a particular function that has a particular vulnerability. In this example, the vulnerability is known as CVE-2021-3177, which refers a stack-based buffer overflow in a module of the PYTHON programming language that can allow an attacker to overflow a buffer on the stack and potentially allow remote code execution. This knowledge can be combined with other knowledge of the knowledge graph. For example, sub-graph 910 also represents that a particular on-demand compute that subscribes to a particular communication channel invokes the particular function that has the particular CVE. A particular VPC edge publishes to the particular communication channel to which the particular on-demand compute describes. Thus, an analysis of sub-graph 910 can reveal that a request to invoke the particular on-demand compute received at the particular VPC edge can cause exposure to the vulnerability via the particular communication channel and the resulting invocation of the particular function.

4.3 Method—Receiving a Machine-Readable Definition File

The method 200 includes receiving a machine-readable definition file 210, which functions to receive information with which to generate at least a portion of the knowledge graph. Additionally or alternatively, 210 can function to receive information with which to perform any suitable processes of the method (e.g. make deficiency finding, etc.). Additionally or alternatively, 210 can include determining (generating) any part or all of the machine-readable definition file, processing or preprocessing the file, or any other suitable processes.

210 can be performed throughout the method 200, such as any or all of: continuously, at a predetermined frequency, at random intervals, prior to each of a set of processes of the method 200, or at any other suitable times. 210 can additionally or alternatively be performed in response to a trigger (e.g., based on an upload of the file to a storage location, etc.), at random intervals, or at any other suitable time(s) during the method 200.

The file received in 210 can include design information specified in a domain specific language, such as a domain specific language based on any or all of: JAVASCRIPT OBJECT NOTATION (JSON), YAML, extensible Markup Language (XML), or any other suitable machine-readable markup language or data format. The file received in step 210 can include data in a GRAPHML or an RDF format (e.g., RDF-XML, TURTLE) or any other suitable data format (e.g., JSON-LD, Common Logic Interchange Format, or a custom or domain data format.) The data can represent graph fragments (e.g., sub-graphs, partial graphs, graphs for a specific kind of scanning) that can be composed into the knowledge base (e.g., as part of step 220).

The design information can include resource information, which describes one or more resources or infrastructure objects associated with a customer cloud including any or all of: virtual networks, compute instances, bare metal machines, services, hosts, databases, virtual machine instances, container instances, container images, source code, software packages, networks, load balancers, microservices, web services, provider network services, gateways, VPC edges, polices, profiles, or any other suitable resource or infrastructure object associated with a customer cloud. Additionally or alternatively, the design information can include any kind of information needed to describe a target system. For example, the design information can include any or all of: source code control flow information, data handling information, server rack layout information, hardware device information such as information about CPUs, buses, peripherals, or storage devices, or any other suitable information about the target system.

4.4 Method—Generating a Knowledge Graph

The method 200 includes generating a knowledge graph 220, which functions to generate a knowledge graph or a portion thereof based on the machine-readable definition file 220. Additionally or alternatively, 220 can function to generate a knowledge graph or a sub-graph thereof based on outputs or results of scanning provider network infrastructure 202, analyzing source code 204, or any other suitable processes.

220 can be performed throughout the method 200, such as any or all of: continuously, at a predetermined frequency, at random intervals, prior to each of a set of processes of the method 200, or at any other suitable times. 220 can additionally or alternatively be performed in response to a trigger (e.g., based on an upload of the file to a storage location, etc.), at random intervals, or at any other suitable time(s) during the method 200.

The knowledge graph can be generated 220 according to a semantic web or non-semantic web ontology such as a web ontology language (OWL) ontology or other suitable ontology. The ontology can include a set of concepts (classes) that are arranged with a corresponding taxonomy. The ontology can include a set of relations that relate concepts to one another. The ontology can include a concept hierarchy in the form a relation (e.g., a binary relation, a binary predicate, etc.). The ontology can include a relation hierarchy in the form a relation. The ontology can include the installation of the concepts in a particular domain (e.g., the provider network domain).

The ontology can include concepts, instances, relations, and axioms related to a provider network domain. A concept (equivalently a class, term, type, kind, or sort) can be an abstract group, set or collection of objects. A concept can be a fundamental element in the provider network domain and can represent a group or class whose members share common properties. Similar to object-oriented systems, a concept can be represented by a super-class, representing a so-called parent class, and a subclass which represents the subordinate or so-called child class. For example, a VPC edge can be represented as a class with many subclasses, such as an internet gateway, an application load balancer, and a VPC peering connection.

The ontology can include instances, which function to represent specific objects or elements of a concept or class. For example, a particular virtual machine instance in a particular customer cloud can be an instance of a class "virtual machine resource" or simply "resource."

The ontology can include relations (equivalently slots or properties), which function to express relationships between two concepts in the provider network domain. A relation could describe a relationship between a first concept and a second concept. For example, "has listener" could be represented as the relationship between the concept "virtual machine instance" and a TCP or UDP port.

The ontology can include axioms, which function to impose constraints on the values of classes or instances. Axioms can be expressed in the ontology using a logic-based language such as first-order logic or description logic. Axioms can be used to verify the consistency of the ontology.

The knowledge graph can be stored as a set of RDF triples or set of other type of semantic triple. The of set of semantic triples represent the collective knowledge about the provider network. A semantic triple can be an atomic data entity that encompasses a set of three entities that codifies a statement about the provider network in the form subject-predicate-object expressions. A semantic triple can represent the attributes (equivalently properties) of components and channels in the provider network. A component is thing in the provider network such as a resource, code, device, data, or any other thing in the provider network that can actually or logically receive or send data. A channel is an actual or logical data communication link between components. Additionally or alternatively, the knowledge graph can be constructed as one or more property graphs implemented as one or more adjacency lists.

Instead of representing a channel in the knowledge graph as an edge between two vertices representing two components, the channel can be represented as a vertex. In particular, a channel can be represented as an intermediate vertex connected to two vertices one of which represents a "plug" component of the channel and the other that represents a "socket" component. This can be done to model that the socket component receives data from the plug component via the channel and that the plug component sends data to the socket component via the channel. The representation of the channel as a vertex in the knowledge graph also allows for modeling plug components that can send data on a channel but for which there is currently no socket component receiving data on the channel and also for modeling socket components that can send data on a channel but for which there is currently no plug component sending data on the channel.

It should be understood that the directionality of a modeled channel is not necessarily linked to the directionality of the medium used to construct the channel. In particular, the plug and socket modeling mechanism can be used to depict how a channel is formed apart from the logical channel flow direction. For example, a serverless function can connect to a data storage service bucket to get data from the bucket but this can be modeled as the serverless function retrieving data from the bucket where the logical channel direction is from the bucket to the serverless function even though the network connection (e.g., a TCP connection) can be established in the direction from the serverless function to the data storage service. Thus, the plug and socket mechanism can be used to model connectors that can be used to form channels, the nature of those connectors, and whether they are being used to form channels in a given system.

Figure 10:
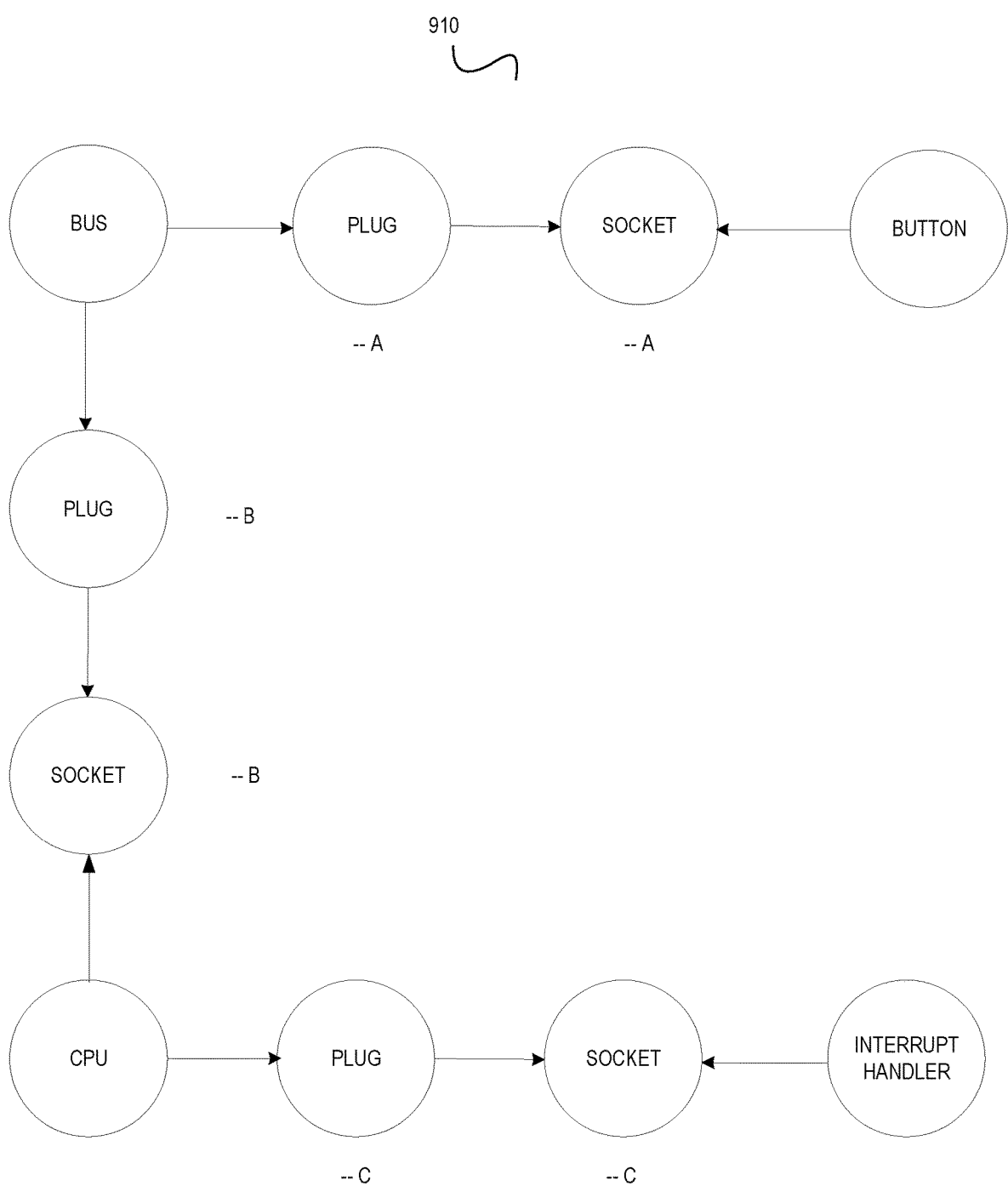
FIG. 10 depicts a sub-knowledge graph variation for representing components and data communication channels in a system.

For example, FIG. 10 illustrates a knowledge sub-graph 1010 modeling a system. In this example, the button, bus, CPU, and interrupt handler are components of the system. The channels between them are represented by vertices in sub-graph 1010. For ease of reference, the channels are labeled A, B, and C in FIG. 10. And the channels are modelled using the generic modelling mechanic. The Button component can be a physical button such as an on/off button of an electronic device. When activated, the Button can send data along Channel A connecting the Button to a Bus (e.g., an I/O interface). The Bus can receive the data sent by the Button from Channel A. In response to receiving the data from the Button via Channel A, the Bus can send data via Channel B to the CPU which, in turn can send data via Channel C to the Interrupt Handler, which contains logic for processing the activation of the Button.

Another benefit of representing channels between components as vertices instead of edges is that the graph computing framework may support vertices with multiple properties/attributes but may not support edges with multiple properties/attributes. For example, the graph computing framework may function to implement the knowledge graph as a set of vertices and edges. The graph computing framework can function to implement a vertex as a set of incoming and outgoing edges and implement an edge as an incoming and outgoing vertex. Furthermore, the graph computing framework can function to implement properties of a vertex as a set of key-value pairs including supporting multi-properties and meta-properties. A multi-property is a property of a vertex that has the same key as one or more other properties of the vertex (e.g., multiple "name" properties). A meta-property is a property of a vertex that has properties (i.e., a vertex property can have key/value data associated with it.). However, the graph computing framework might function to implement edges by allowing only one predefined property of the edge (e.g., a "name" property.). For example, FIG. 11 shows a possible sub-graph 1110 where a channel between a VPC edge component and a VM instance component is represented by an edge in the knowledge graph with the name "TCP PORT 22" to representing that the VPC edge can connected to TCP port 22 of the VM instance. However, due to the limitations of the graph computing framework, adding additional properties of the edge may not be possible. Thus, instead of representing the data communications channel as an edge in the knowledge graph, the channel can be represented as a vertex as in sub-graph 1020. With sub-graph 1120 representation, a set of one or more properties can be associated with the channel vertex, unless with the channel edge of sub-graph 1110.

FIG. 12 depicts examples of how the plug and socket modeling mechanism can be visually represented such as in a graphical user interface. In representation 1210, the proximity of the plug and socket implies a connection between the plug component (in this example a serverless function) and the socket component (in this example a cluster component). Representation 1220 provides an alternative representation where a directed arrow from the plug to the socket is used to represent the connection between the plug component and the socket component.

FIG. 13 depicts an example of an RDF model 1310 that uses the plug and socket modeling mechanism to represent knowledge about a system in the knowledge base. Node 1312 represents a serverless function instance. Node 1314 represents a plug instance. Node 1316 represents a socket instance. Node 1318 represents a server cluster instance. Node 1320 represents the plug class. Node 1322 represents OWL classes. Node 1324 represents the socket class. The RDF model 1310 depicts each forming half of a connection (e.g., a channel) as a named or anonymous node as appropriate for the context. Each provides an attachment point for metadata ("knowledge") describing the nature of the connection between two components. The example 1310 shows that type knowledge graph fragment needed for a machine (computer) to understand which node is a plug and which is a socket.

FIG. 14 depicts an example portion 1410 of the knowledge graph that uses the plug and socket modeling mechanism to represent knowledge about a system that combines hardware, software, and cloud components. The plug and socket nodes of the graph portion 1410 are represented in FIG. 14 using the visual notation of the example 1210 of FIG. 12. The example of FIG. 14 also illustrates how knowledge about the connections, channels, or relationships between components in a system can be represented at different levels using the plug and socket mechanism. For example, at one level as depicted in FIG. 14, the button press handler software component invokes the upload handler software component. Using the plug and socket modeling mechanism, the knowledge that the button press handler initiates a call with certain function call arguments to the upload handler is represented as well as that the upload handler provides a function call interface that accepts certain parameters.

FIG. 15 depicts examples 1510 and 1520 of how a queue channel can be modeled in the knowledge graph at various levels of abstraction. Example 1510 provides an example of a high level of abstraction. Example 1510 depicts flow of information from a sender to a receiver. However, the construction and nature of the queue channel are not represented. This model may be useful to provide a high-level overview of the queue channel, but the model provides limited computer analysis opportunities. Example 1520 depicts the queue channel at an intermediate level of abstraction. In example 1520, the queue channel is promoted to a node (vertex) in the knowledge graph. By doing so, the queue channel can be represented in greater detail in the knowledge graph (e.g., the queue channel becomes an individual in the domain of discourse). Nonetheless, example 1520 allows examination of a constructed queue channel but not the construction of the queue channel.

FIG. 16 depicts an example 1610 of modeling the queue channel in the knowledge graph using the plug and socket modeling mechanism. By using the plug and socket modeling mechanic, the connections to the entity that performs the channel function are fully explicated. As illustrated by the example 1610, the plug and socket modeling mechanic facilitates examination of the structure of data channels.

FIG. 17 depicts an example portion 1710 of the knowledge graph that uses the plug and socket modeling mechanic to represent a channel between a serverless function and a database.

FIG. 17 also provides an RDF Turtle format example 1720 of the example graph portion 1710.

FIG. 18 depicts an example portion 1810 of the knowledge graph that uses the plug and socketing modeling mechanic to represent a channel between an on-demand compute function and a function in a source code file that contains a common vulnerability.

4.5 Method—Determining a Deficiency Finding

The method 200 can optionally include determining a deficiency finding 230, which functions to analyze the knowledge graph for patterns that represent deficiencies. Additionally or alternatively, 230 can function to determine a deficiency finding based on other analysis or any other suitable processes.

230 can be performed throughout the method 200, such as any or all of: continuously, at a predetermined frequency, at random intervals, prior to each of a set of processes of the method 200, or at any other suitable times. 230 can additionally or alternatively be performed in response to a trigger (e.g., based on an upload of the file to a storage location, etc.), at random intervals, or at any other suitable time(s) during the method 200.

Operation 230 can include applying semantic reasoning to the knowledge graph. Semantic reasoning can include inferring new facts from the knowledge graph based on a set of one or more inference rules or a set of one or more ontologies. An inference rule can add new knowledge to the knowledge graph in the form of a sub-knowledge graph, which can represent context, knowledge, or insight into the provider network or customer cloud. An inference rule can be declarative, which functions to declare the desired logic of connections in the knowledge graph. Inferring new facts can happen through pre-materialization, query rewriting, or a combination thereof.

Operation 230 can function to predict missing links or facts by reasoning on the existing knowledge graph. Operation 230 can function to use logic rules for reasoning on the knowledge graph implicitly or explicitly. Reasoning can include using any or all of: neural reasoning methods, symbolic logic methods, neural-symbolic methods, logic rule induction methods, or any other suitable reasoning technique. Neural reasoning methods that can be used include any or all of: knowledge graph embeddings (e.g., TransE, ComplEx, RotateE, QuatE, etc.), graph neural networks (e.g., RGCN, GraIL, etc.), or any other suitable neural reasoning method. Symbolic logic methods that can be include any of all of: logic programming (e.g., forward chaining, backward chaining, etc.); Bayesian logic programming (e.g., ProbLog, DeepProbLog, etc.); Markov logic programming (e.g., Marlov logic networks, etc.); stochastic logic programming (e.g., TensorLog, etc.); or any other suitable symbolic logic technique. Neural-symbolic methods that can be used include any or all of: Markov logic programming-based (e.g., pLogicNet, etc.); stochastic logic programming-based (e.g., ProPPR, etc.), or any other suitable neural-symbolic technique. Logic rule induction methods that can be used include any of all of: inductive logic programming (ILP); neural-powered ILP (e.g., differentiable ILP, neural theorem provers, RNNLogic, etc.); neural ILP with stochastic logic programming (SLP) (e.g., neuralLP, DeepPath, NBFNet, etc.), or any other suitable logic rule induction technique.

Operation 230 can include constraint checking the knowledge graph. Constraint checking the knowledge graph can include validating the contents (e.g., RDF triples) of the knowledge graph. Validating the contents of the knowledge graph can include applying a set of constraints described by graph structure shapes. A graph structure shape can contain a description of its targets—the vertexes to be validated. For example, a target can be all instances of a particular class, objects with a particular property, an explicit set of vertices, or other target. A graph structure shape can be one of two types: node and property. A node graph structure shape applies a set of one or more constraints to target vertices of the knowledge graph. A property graph structure shape applies a set of one or more constraints to properties of vertices targeted by the property graph structure shape.

Operation 230 can include traversing the knowledge graph. The knowledge graph can be viewed as the topology (e.g., arrangement of constituent parts) formed by the explicit references between the graph's vertices, edges, labels, and properties. A vertex in the graph can have a set of one or more incident edges. A vertex can be adjacent to another vertex in the graph if the two vertices share an incident edge. A vertex or an edge in the graph can have exactly one label which may be distinct from a property of the vertex or edge. The label of a vertex or edge may be used to attach meaning or an identifier to the vertex or edge. A property can be attached to an element (e.g., a vertex) and an element can have a set of one or more properties. A property can be like a key-value pair, where the key is a character string data type. A traversal of the knowledge graph can encompass algorithmic walk across the vertices, edges, and properties of the knowledge graph according to the referential structure explicit within the graph data structure. For example, the question "what VPC edges can reach TCP ports that VM instance "SLNQ" listening on?" might be represented in the following algorithmic/traversal fashion:

1. Start at the vertex representing VM instance "SLNQ."
2. Walk the incident "listening on" edges to the respective adjacent "TCP port" vertices of the starting vertex representing VM instance "SLNQ".
3. Move from those "TCP port" vertices to "VPC edge" vertices via "can reach" edges.
4. Finally, select the "id" property value of the current "VPC edge" vertices.

A traversal of the knowledge graph can start at a set of one or more vertices of the knowledge graph (starting vertices). The starting vertices can include all vertices of the knowledge graph or a selected or identified subset thereof. Alternatively, a traversal of the knowledge graph can start at a set of one or more edges of the knowledge graph (starting edges). The starting edges can include all edges of the knowledge graph or a selected or identified subset thereof.

A traversal of the knowledge graph can encompass visiting a set of one or more vertices of the knowledge graph along a traversal path. At each visit of a vertex, a pattern or expression can be applied to the label or one or more properties of the vertex or to the label or one or more properties of each of one or more edges incident in the graph to the vertex. Based on the results of applying the pattern or expression, data can be collected and carried along the traversal path (e.g., in a memory buffer) encompassing one or more values of one or more properties of the vertex or one or more incident edges. Additionally or alternatively, an incident edge to traverse to a next vertex in the traversal path can be selected based on the results of applying the pattern or expression, or a determination to stop the traversal can be made based on the results of applying the pattern or expression.

RDF, TinkerPop, Labeled Graphs, Property Graphs, and other known systems and graph models used herein as examples to demonstrate the function of the graph system but the implementation of the proposed plug and socket mechanism is not limited to those systems and graph models.

4.6 Method—Providing the Deficiency Finding

The method 200 can optionally include providing the deficiency finding 240, which functions to provide a deficiency finding to a customer. Additionally or alternatively, 230 can function to provide a deficiency finding to system(s) or process(es).

240 can be performed throughout the method 200, such as any or all of: continuously, at a predetermined frequency, at random intervals, prior to each of a set of processes of the method 200, or at any other suitable times. 240 can additionally or alternatively be performed in response to a trigger (e.g., based on an upload of the file to a storage location, etc.), at random intervals, or at any other suitable time(s) during the method 200.

240 can function to provide the deficiency finding a graphical user interface. For example, FIG. 3, FIG. 4, and FIG. 5 depict possible graphical user interfaces for providing a deficiency finding. Addition or alternatively, a deficiency finding can be provided in a command line interface or in a response to an API request (e.g., in a JSON, YAML, XML, or other suitable format).

5. Provider Network Environment

FIG. 19 illustrates a provider network environment 1900 in which the techniques disclosed herein can be implemented, according to some examples. The environment 1900 includes a provider network 1910 and optionally an intermediate network 1930 and a customer network 1940. In other examples, the intermediate network 1930 or the customer number 1940 are part of the provider network 1910. The provider network 1910 can provide resource virtualization to a customer of provider network via a virtualization service 1918. The virtualization service 1918 can allow the customer to purchase, rent, subscribe to, or otherwise obtain use of one or more resource instances (e.g., resource instance 1912).

A resource instance can include, but is not limited to, a compute, storage, or network resource. The resource instance can be implemented by an electronic device in a datacenter within the provider network. The datacenter can be a physical facility or building that houses compute, storage, and network infrastructure. The provider network 1910 can encompass many resource instances implemented by many electronic devices distributed over a set of datacenters located in different geographic regions or locations. An example of an electronic device is device 2000 described below with respect to FIG. 20.

Examples of a resource instance include a virtual machine (VM) and a container. A virtual machine can be a compute resource that uses software instead of a physical computer to run a program and deploy an application. A virtual machine (sometimes called a "guest") can run on a single physical machine (sometimes called the "host"). A virtual machine can execute its own operating system (e.g., UNIX, WINDOWS, LINUX, etc.) and can function separately from other virtual machines, including those on the same host. A virtual machine can be a substitute for a physical machine. A host's physical resources can be shared between multiple virtual machines each running its own copy of an operating system. Access to and use of the host's physical resources (e.g., hardware processor and physical memory resources) by the multiple virtual machines is coordinated by a virtual machine monitor (sometimes called a "hypervisor"). The hypervisor itself can run on the bare hardware of the host or as a process of an operating system that runs on the bare hardware.

A container is like a virtual machine with respect to running separate applications on a single platform. However, a container isolates the execution of a single application on a host machine, while a virtual machine isolates an entire 'computer' that runs an operating system by emulating the computer's hardware using virtualization techniques. Another difference is that a container system (e.g., LINUX CGROUPS, FREEBSD JAILS, or MACOS SANDBOXES) typically provides the services of an operating system kernel that runs on the bare hardware of the underlying host to containers that share the kernel services as orchestrated by the container system. The container system itself runs on the host with the aid of the operating system kernel and isolates the containers from each other to a certain degree. While a container can be used independently of a virtual machine, a container and a virtual machine can be used together. For example, a container can run on an operating system that runs on a virtual machine or a type 2 hypervisor can run as a process within a container.

Within the provider network 1910, a local Internet Protocol (IP) address 1914 can be associated with a resource instance 1912. The local IP address 1914 can include an internal or private network address in the provider network 1910. The local IP address 1914 can be an IPV4 or IPv6 address, for example. For example, the local IP address 1914 can be one reserved by Internet Engineering Task Force (IETF) Request for Comments (RFC) 1918 or having an address format specified by IETF RFC 4193 and can be mutable within the provider network 1910. While in some examples IP addresses are used in provider network 1910, other addressing mechanisms such as Named Data Network (NDN) addressing could be used in addition to or as an alternative to IP addressing.

Network traffic originating outside the provider network 1910—e.g., from a network entity 1920 coupled to the intermediate network 1930 or a customer device 1942 in the customer network 1940—that is destined for a resource instance 1912 in the provider network 1910 sometimes is not directly routed to a local IP address 1914. Instead, the network traffic is addressed to a public IP address 1916. The public IP address 1916 is mapped by the provider network 1910 to the local IP address 1914 using network address translation (NAT) or similar technology.

Using a customer device 1942 in the customer network 1940, the customer can use, control, operate, or benefit from the virtualization service 1918, a resource instance 1912, a local IP address 1914, and a public IP address 1916 to implement a customer-specific application and offer the application to one or more network entities (e.g., network entity 1920) on the intermediate network 1930 such as, for example, the Internet. A network entity 1920 can then generate network traffic destined for the application by addressing the network traffic for the public IP address 1916. The traffic can then be routed via the intermediate network 1930 to the datacenter of the provider network 1910 which houses the electronic device that implements the resource instance 1912. Within the data center, the traffic can be routed to the local IP address 1914 where the traffic is received and processed by the resource instance 1912. Response network traffic from the resource instance 1912 can be routed back onto the intermediate network 1930 to the network entity 1920.

6. Electronic Device

FIG. 20 illustrates electronic device 2000 that can be used in an implementation of the techniques disclosed herein, according to some examples. Device 2000 can include a set of one or more processors 2002-1, 2002-2, . . . , 2002-N coupled to system memory 2006 via an input/output (I/O) interface 2004. The device 2000 can further include a network interface 2016 coupled to the I/O interface 2004.

The device 2000 can be a uniprocessor system including one processor or can be a multiprocessor system including multiple processors. Each of processors 2002-1, 2002-2, . . . , 2002-N can be any suitable processor capable of executing instructions. For example, each of the processors 2002-1, 2002-2, . . . , 2002-N can be general-purpose or embedded processor implementing any of a variety of instruction set architectures (ISAs), such as the X86, ARM, POWERPC, SPARC, or MIPS ISAs, or any other suitable ISA.

The system memory 2006 can store instructions and data accessible by the processor(s) 2002-1, 2002-2, . . . , 2002-N. The system memory 2006 can be implemented using any suitable memory technology, such as random-access memory (RAM), static RAM (SRAM), synchronous dynamic RAM (SDRAM), nonvolatile or Flash-type memory, or any other type of memory. Program instructions 2008 and data 2010 implementing a desired function, such as a method, process, act, or operation of the techniques disclosed herein, are stored within the system memory 2006 as code 2008 (e.g., executable to implement, in whole or in part, a method, process, act, or operation performed by the deficiency management computing system of FIG. 1) and data 2010.

The I/O interface 2004 can be configured to coordinate I/O traffic between the processor(s) 2002-1, 2002-2, . . . , 2002-N, the system memory 2006, and any peripheral devices in device 2000, including, optionally, a network interface 2016 or other peripheral interfaces (not shown). The I/O interface 1S04 can perform any necessary protocol, timing, or other data transformations to convert data signals from one component (e.g., the system memory) into a format suitable for use by another component (e.g., the processor(s) 2002-1, 2002-2, . . . , 2002-N).

The I/O interface 2004 can include support for devices attached through various types of peripheral buses, such as a variant of the PERIPHERAL COMPONENT INTER-CONNECT (PCI) bus standard or the UNIVERSAL SERIAL BUS (USB) standard, for example (e.g., a bus implementing a version of the PERIPHERAL COMPONENT INTERCONNECT-EXPRESS (PCI-E) standard, or another interconnect such as a QUICKPATH INTERCONNECT (QPI) or ULTRAPATH INTERCONNECT (UPI)). The function of the I/O interface 2004 can be split into two or more separate components, such as a north bridge and a south bridge, for example. Also, some of the functionality of the I/O interface 2004, such as an interface to the system memory 2006, can be incorporated directly into the processor(s) 2002-1, 2002-2, . . . , 2002-N.

An optional network interface 2016 can be configured to allow data to be exchanged between device 2000 and another electronic device 2020 attached to device 2000 via a network 2018. The network interface 2016 can support communication via any suitable wired or wireless networks, such as a type of wired or wireless Ethernet network, for example. Additionally, the network interface 2016 can support communication via telecommunications or telephony networks, such as analog voice networks or digital fiber communications networks, via storage area networks (SANs), such as FIBRE CHANNEL SANS, or via any other suitable type of network or protocol.

The device 2000 can optionally include an offload card 2012 including a processor 2014, and possibly including a network interface (not depicted), that is connected using the I/O interface 2004. For example, device 2000 can act as a host electronic device (e.g., operating as part of a hardware virtualization service) that hosts compute resources such as compute instances, and the offload card 2012 can execute a virtualization manager that can manage compute instances that execute on the host electronic device 2000. As an example, the offload card 2012 can perform compute instance management operations, such as pausing or un-pausing compute instances, launching or terminating compute instances, performing memory transfer/copying operations, etc. These management operations can be performed by the offload card in coordination with a hypervisor (e.g., upon a request from a hypervisor) that is executed by the processor(s) 2002-1, 2002-2, . . . , 2002-N of device 2000. However, the virtualization manager implemented by the offload card 2012 can accommodate requests from other entities (e.g., from compute instances themselves).

The system memory 2006 can encompass one or more computer-accessible media configured to store program instructions 2008 and data 2010. However, program instructions 2008 or data 2010 can be received, sent, or stored upon different types of computer-accessible media. Computer-accessible media includes non-transitory computer-accessible media and computer-accessible transmission media. Examples of non-transitory computer-accessible media include volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EE-PROM), ferroelectric RAM, and other computer data storage devices (e.g., disk storage, hard disks drives, optical discs, floppy disks, and magnetic tape).

7. Extensions and Alternatives

Embodiments of the system or method can include every combination and permutation of the various system components and the various method processes, wherein one or more instances of the method or processes described herein can be performed asynchronously (e.g., sequentially), concurrently (e.g., in parallel), or in any other suitable order by or using one or more instances of the systems, elements, or entities described herein.

Ordinal terms such as first, second, etc. may be used in the foregoing description and in the appended claims to describe various elements, features, acts, or operations. Unless the context clearly indicates otherwise, such elements, features, acts, or operations are not limited by those terms. The terms are used only to distinguish one element, feature, act, or operation from another. For example, a first device could be termed a second device. The first device and the second device are both devices, but they are not the same device.

Unless the context clearly indicates otherwise, as used in the foregoing description and in the appended claims, the singular forms "a," "an," and "the" are intended to include the plural forms as well.

Unless the context clearly indicates otherwise, as used in the foregoing description and in the appended claims, the terms "comprising," "including," "having," "based on," "encompassing," and other like terms, are used in the foregoing description and in the appended claims in an open-ended fashion, and do not exclude additional elements, features, acts, or operations.

In the case of "based on," the term is used in the foregoing description and in the appended claims in some instances to identify a causal relationship between stated steps, acts or operations. Unless the context clearly indicates otherwise, "A based on B" in these instances means that the performance of step, act, or operation B causes the performance of step, act, or operation A. The causal relationship can be direct (via no intermediate steps, acts, or operations) or indirect (via the performance of one or more intermediate steps, acts, or operations). However, unless the context clearly indicates otherwise, the term "A based on B" is not intended to require the performance of B be necessary in all cases to cause the performance of A, and A may be performed in some cases without being caused by the performance of B. In those cases, however, A would not be based on B. Further, unless the context clearly indicates otherwise, the term "A based on B" is not intended to require that the performance of B by itself be sufficient in all cases to cause the performance of A, and one or more other steps, acts, or operations in addition to B may be performed in some cases to cause the performance of A. In such circumstances, A can still be based on B even though multiple steps, acts, or operations including B are performed to cause A.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

As a person skilled in the art will recognize from the previous detailed description and from the figures and claims, modifications and changes can be made to the examples of the techniques without departing from the scope of the invention defined in the following claims.

The invention claimed is:

1. A method comprising:
scanning a set of resources, including one or more of software resources or hardware resources, associated with a provider network customer cloud, including scanning a virtual machine instance of the set of resources by scanning one or more ports of the virtual machine instance for listeners;
analyzing source code associated with the set of resources;
receiving a machine-readable definition file declaring the set of resources;
generating a knowledge graph for the set of resources based on the scanning of the set of resources, the analyzing of the source code, and the machine-readable definition file, wherein the knowledge graph comprises a set of nodes and edges representing a data communication channel between a first resource of the set of resources and a second resource of the set of resources, wherein the set of nodes and edges comprises a plug component node, a plug node, a socket node, a socket component node, a first edge from the plug component node to the plug node, a second edge from the plug node to the socket node, and a third edge from the socket component node to the socket node, and wherein at least one of the first resource and the second resource is a hardware resource of the hardware resources;
determining a deficiency finding based on the knowledge graph; and
providing the deficiency finding in a user interface.

2. The method of claim 1, wherein generating the knowledge graph for the set of resources is further based on applying semantic reasoning to an initial knowledge graph generated based on the scanning of the set of resources, the analyzing of the source code, and the machine-readable definition file.

3. The method of claim 1, further comprising determining the deficiency finding based on traversing the knowledge graph.

4. A method comprising:
receiving a machine-readable definition file declaring a set of resources including one or more of software resources or hardware resources, wherein the machine-readable definition file is based at least in part on a scan of the set of resources, including a scan for listeners at one or more ports of a virtual machine instance of the set of resources;
generating a knowledge graph for the set of resources based on the machine-readable definition file, wherein the knowledge graph comprises a set of nodes and edges representing a data communication channel between a first resource of the set of resources and a second resource of the set of resources, wherein the set of nodes and edges comprises a plug component node, a plug node, a socket node, a socket component node, a first edge from the plug component node to the plug node, a second edge from the plug node to the socket node, and a third edge from the socket component node to the socket node, and wherein at least one of the first resource and the second resource is a hardware resource of the hardware resources;
determining a deficiency finding based on the knowledge graph; and
providing the deficiency finding.

5. The method of claim 4, wherein generating the knowledge graph for the set of resources is further based on scanning container images associated with a provider network customer cloud.

6. The method of claim 4, wherein source code is deployed to the set of resources in source code form, interpretable form, or executable form.

7. The method of claim 4, wherein the set of resources declared by the machine-readable definition file is deployed in a provider network customer cloud.

8. The method of claim 4, wherein the set of resources declared by the machine-readable definition file is planned to be deployed in a provider network customer cloud.

9. The method of claim 4, wherein generating the knowledge graph for the set of resources is further based on applying semantic reasoning to an initial knowledge graph for the set of resources.

10. The method of claim 4, wherein determining the deficiency finding is based on traversing the knowledge graph.

11. The method of claim 10, wherein providing the deficiency finding comprises providing the deficiency finding to a customer of a provider network in a graphical user interface, a command line interface, or in a response to an application programming language request.

12. The method of claim 10, wherein the deficiency finding comprises data representing a finding, a severity indication, a description of the finding, a detailed trace of the finding, and a recommendation to remediate the finding.

13. The method of claim 4, wherein the knowledge graph comprises a set of semantic triples representing the set of resources and comprises a web ontology language (OWL) ontology.

14. A system comprising:
one or more electronic devices to implement a deficiency management computing system, the deficiency management computing system comprising instructions which when executed by one or more processors cause the deficiency management computing system to:
receive a machine-readable definition file declaring a set of resources for a provider network customer cloud, the set of resources including one or more of software resources or hardware resources, wherein the machine-readable definition file is based at least in part on a scan of the set of resources, including a scan for listeners at one or more ports of a virtual machine instance of the set of resources;
generate a knowledge graph for the set of resources based on the machine-readable definition file, wherein the knowledge graph comprises a set of nodes and edges representing a data communication channel between a first resource of the set of resources and a second resource of the set of resources, wherein the set of nodes and edges comprises a plug component node, a plug node, a socket node, a socket component node, a first edge from the plug component node to the plug node, a second edge from the plug node to the socket node, and a third edge from the socket component node to the socket node, and wherein at least one of the first resource and the second resource is a hardware resource of the hardware resources;

determine a deficiency finding based on the knowledge graph; and provide the deficiency finding in a user interface.

15. The system of claim 14, wherein the instructions when executed by the one or more processors further cause the deficiency management computing system to generate the knowledge graph for the set of resources based on scanning container images, serverless function deployment packages, data storage bucket configurations, or key-value database tables associated with the provider network customer cloud.

16. The system of claim 14, wherein the instructions when executed by the one or more processors further cause the deficiency management computing system to generate the knowledge graph for the set of resources based on analyzing source code associated with the provider network customer cloud.

17. The system of claim 16, wherein the source code associated with the provider network customer cloud is deployed to the set of resources in the provider network customer cloud in source code form, interpretable form, or executable form.

18. The system of claim 14, wherein the set of resources declared by the machine-readable definition file is deployed in the provider network customer cloud.

19. The system of claim 14, wherein the set of resources declared by the machine-readable definition file is planned to be deployed in the provider network customer cloud.

20. The system of claim 14, wherein the knowledge graph comprises a set of semantic triples representing the set of resources and comprises a web ontology language (OWL) ontology.

* * * * *